United States Patent
Lee

(10) Patent No.: US 10,678,476 B2
(45) Date of Patent: Jun. 9, 2020

(54) MEMORY SYSTEM WITH HOST ADDRESS TRANSLATION CAPABILITY AND OPERATING METHOD THEREOF

(71) Applicant: SK hynix Inc., Gyeonggi-do (KR)

(72) Inventor: Dong Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 53 days.

(21) Appl. No.: 16/028,605

(22) Filed: Jul. 6, 2018

(65) Prior Publication Data

US 2019/0146712 A1    May 16, 2019

(30) Foreign Application Priority Data

Nov. 13, 2017  (KR) ........................ 10-2017-0150660

(51) Int. Cl.
| G06F 12/00 | (2006.01) |
| G06F 3/06 | (2006.01) |
| G06F 12/10 | (2016.01) |
| G06F 12/02 | (2006.01) |

(52) U.S. Cl.
CPC .......... G06F 3/0659 (2013.01); G06F 3/0604 (2013.01); G06F 3/0656 (2013.01); G06F 3/0679 (2013.01); G06F 12/0246 (2013.01); G06F 12/10 (2013.01); *G06F 2212/1044* (2013.01); *G06F 2212/7201* (2013.01)

(58) Field of Classification Search
CPC .. G06F 12/0813; G06F 11/1484; G06F 11/00; G06F 12/0842; G06F 12/0815; G06F 12/0875; G06F 12/0246; G06F 11/202; G06F 2212/284; G06F 2212/264; G06F 2212/6042; G06F 2212/452; G06F 2212/283; H04L 67/2842; H04L 67/1095
USPC ................ 711/103, 202, 203, 205, 206, 207
See application file for complete search history.

(56) References Cited

U.S. PATENT DOCUMENTS

| 5,734,858 A | 3/1998 | Patrick et al. |
| 9,164,676 B2* | 10/2015 | Craft .................. G06F 12/0246 |
| 2008/0005529 A1* | 1/2008 | Morris ................ G06F 12/1036 |
| | | 711/207 |

FOREIGN PATENT DOCUMENTS

KR     101301840     8/2013

* cited by examiner

*Primary Examiner* — Mardochee Chery
(74) *Attorney, Agent, or Firm* — IP & T Group LLP

(57) ABSTRACT

A memory system and an operating method thereof are provided. The memory system includes a controller buffer memory, a host interface configured to receive non-linear host physical addresses and write data from a host, a host address translation section configured to map the non-linear host physical addresses to linear virtual addresses, and a host control section configured to buffer the write data in the controller buffer memory according to the linear virtual addresses.

20 Claims, 15 Drawing Sheets

FIG. 9

| PHYSICAL ADDRESS ALLOCATION | | | VIRTUAL ADDRESS ALLOCATION | | | VIRTUAL–PHYSICAL ADDRESS MAPPING TABLE | |
|---|---|---|---|---|---|---|---|
| t | PBID | HPA | | PBID | VA | VBID | PBID |
| t0 | 8 | E000 | | 1 | 0 | 1 | 8 |
| t1 | 1 | 0 | | 2 | 2000 | 2 | 1 |
| t2 | 2 | 2000 | | 3 | 4000 | 3 | 2 |
| t3 | 5 | 8000 | | 4 | 5000 | 4 | 5 |
| t4 | 3 | 4000 | | 5 | 8000 | 5 | 3 |
| t5 | 7 | C000 | | 6 | A000 | 6 | 7 |
| t6 | 6 | A000 | | 7 | C000 | 7 | 6 |
| t7 | 4 | 6000 | | 8 | E000 | 8 | 4 |
| t8 | 4 | 6000 | | 9 | 10000 | 9 | 4 |
| t9 | 1 | 0 | | 10 | 12000 | 10 | 1 |
| t10 | 3 | 4000 | | 11 | 14000 | 11 | 3 |
| t11 | 6 | A000 | | 12 | 16000 | 12 | 6 |
| t12 | 1 | 0 | | 13 | 18000 | 13 | 1 |
| t13 | 6 | A000 | | 14 | 1A000 | 14 | 6 |
| t14 | 5 | 8000 | | 15 | 1C000 | 15 | 5 |
| t15 | 8 | E000 | | 16 | 1E000 | 16 | 8 |
| t16 | 7 | C000 | | 1 | 0 | 1 | 7 |
| t17 | 3 | 4000 | | 2 | 2000 | 2 | 3 |
| t18 | 2 | 2000 | | 3 | 4000 | 3 | — |

<- roll-back

MEMORY SYSTEM WITH HOST ADDRESS TRANSLATION CAPABILITY AND OPERATING METHOD THEREOF

CROSS-REFERENCE TO RELATED APPLICATION

The present application claims priority under 35 U.S.C. § 119(a) to Korean patent application number 10-2017-0150660, filed on Nov. 13, 2017, the entire disclosure of which is herein incorporated by reference.

BACKGROUND

1. Field of Invention

Various embodiments of the invention relate to a memory system and an operating method thereof. Particularly, the embodiments relate to a memory system capable of translating non-linear host physical addresses into linear virtual addresses and buffering data, which is stored in a host buffer memory, into a controller buffer memory, and an operating method thereof.

2. Description of Related Art

A non-volatile memory device may include a plurality of memory blocks. In addition, each of the memory blocks may include a plurality of memory cells, and an erase operation may be simultaneously performed on memory cells in one memory block.

When a memory system receives a write command and a logical address from a host, the memory system may allocate a physical address corresponding to the logical address and write data into a memory area corresponding to the physical address.

The memory system may temporarily store address mapping information in a buffer memory and flush the address mapping information stored in the buffer memory to the non-volatile memory device. In addition, the memory system may load the address mapping information stored in the non-volatile memory device to the buffer memory when power is on.

SUMMARY

Various embodiments are directed to a memory system efficiently performing a write operation and a read operation by translating non-linear host physical addresses into linear virtual addresses, and an operating method thereof.

According to an embodiment, a memory system may include a controller buffer memory, a host interface configured to receive non-linear host physical addresses and write data from a host, a host address translation section configured to map the non-linear host physical addresses to linear virtual addresses, and a host control section configured to buffer the write data in the controller buffer memory according to the linear virtual addresses.

According to another embodiment, a memory system may include a controller buffer memory including a plurality of controller buffer units configured to buffer data, a host address translation section configured to generate a physical-virtual address mapping table, and a host control section configured to output the data buffered in the controller buffer memory to a host buffer memory of a host according to the physical-virtual address mapping table, wherein the physical-virtual address mapping table includes a plurality of non-linear host buffer IDs corresponding to a plurality of host buffer units in the host buffer memory and a plurality of linear virtual buffer IDs corresponding to the plurality of controller buffer units.

According to another embodiment, a method of operating a memory system may include receiving a write command including non-linear host physical addresses from a host, mapping the non-linear host physical addresses to linear virtual addresses, using an address translation component, fetching write data from a host buffer memory of the host according to the non-linear host physical addresses, and buffering the write data in a controller buffer memory according to the linear virtual addresses.

According to another embodiment, a memory system may include a memory device; and a controller configured to: convert non-sequential buffer addresses into sequential buffer addresses; convert a logical address into a physical address; buffer data in a sequential manner according to the sequential buffer addresses; and control the memory device to perform an operation for the data according to the physical address, wherein the non-sequential buffer addresses represent buffer space allocated for the data in a non-sequential manner in a host, and wherein the data is provided from the buffer space for the buffering operation.

BRIEF DESCRIPTION OF THE DRAWINGS

FIG. 9 is a diagram illustrating an address mapping method according to an embodiment;

DETAILED DESCRIPTION

Figure 1:
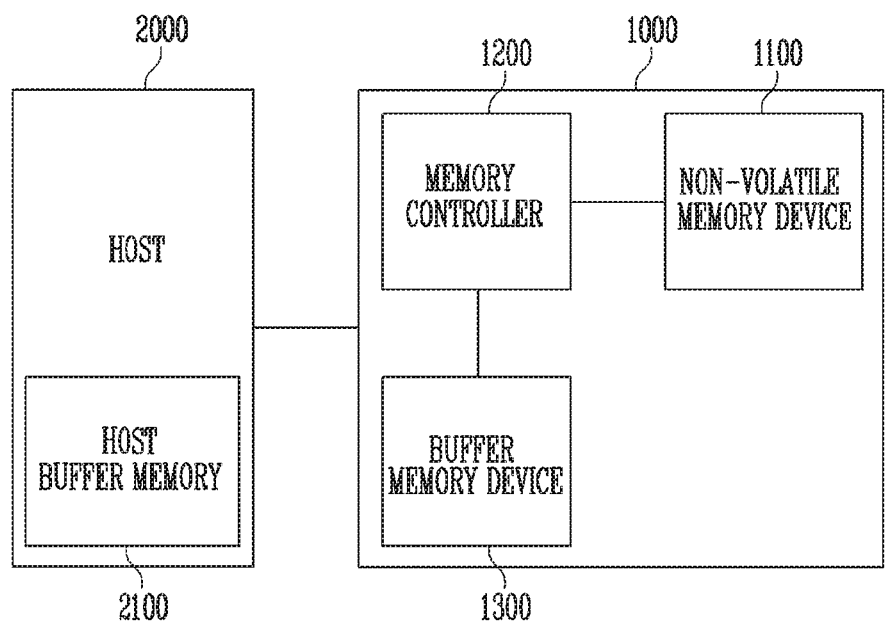
FIG. 1 is a diagram illustrating a memory system according to an embodiment.

Various embodiments will be described in detail with reference to the accompanying drawings. It is noted that reference to "an embodiment" is not necessarily to only one embodiment, and different references to "an embodiment" are not necessarily to the same embodiment(s). In the drawings, thicknesses and lengths of components may be exaggerated for clarity. In the following description, detailed description of known technology may be omitted for conciseness and so as not to unnecessarily obscure the invention. Like reference numerals refer to like elements throughout the specification and drawings.

It is also noted that in this specification, "connected/coupled" refers to one component not only directly coupling another component but also indirectly coupling another component through one or more intermediate components. In addition, throughout the specification, when it is stated that a certain part "includes" a certain element, this does not exclude other elements; rather, the certain part may further include one or more additional elements, unless stated or the context requires otherwise.

The terminology used herein is for the purpose of describing particular embodiments only and is not intended to be limiting of the present invention.

As used herein, singular forms may include the plural forms as well and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Hereinafter, the various embodiments of the present invention will be described in detail with reference to the attached drawings.

FIG. 1 is a diagram illustrating a memory system 1000 according to an embodiment.

Referring to FIG. 1, the memory system 1000 may include a non-volatile memory device 1100 that does not lose stored data even in the absence of power supply, a buffer memory device 1300 that temporarily stores data, and a memory controller 1200 that controls the non-volatile memory device 1100 and the buffer memory device 1300 in response to control of a host 2000.

The host 2000 may communicate with the memory system 1000 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Non-volatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The memory controller 1200 may control the general operations of the memory system 1000 and control data exchange between the host 2000 and the non-volatile memory device 1100. For example, the memory controller 1200 may control the non-volatile memory device 1100 to program or read data in response to a request from the host 2000. In addition, the memory controller 1200 may store information about main memory blocks and sub-memory blocks in the non-volatile memory device 1100, and may select the non-volatile memory device 1100 to perform a program operation on a main memory block or a sub-memory block according to the amount of data loaded for the program operation. According to an embodiment, the non-volatile memory device 1100 may include a flash memory.

The memory controller 1200 may control data exchange between the host 2000 and the buffer memory device 1300 or may temporarily store system data for controlling the non-volatile memory device 1100 in the buffer memory device 1300. The memory buffer 1300 may serve as an operation memory, a cache memory, or a buffer memory of the memory controller 1200. The memory buffer 1300 may store codes and commands executed by the memory controller 1200. The memory buffer 1300 may store data processed by the memory controller 1200.

The memory controller 1200 may temporarily store the data input from the host 2000 and transmit the data temporarily stored in the buffer memory device 1300 to the non-volatile memory device 1100 to store the data. In addition, the memory controller 1200 may receive data and a logical address from the host 2000 and translate the logical address into a physical address indicating a region where the data is actually stored. In addition, the memory controller 1200 may store a logical-physical address mapping table configuring a mapping relationship between a logical address and a physical address in the buffer memory device 1300.

According to an embodiment, the buffer memory device 1300 may include Double Data Rate Synchronous Dynamic Random Access Memory (DDR SDRAM), Low Power Double Data Rate4 (LPDDR4) SDRAM, Graphics Double Data Rate (GDDR) SDRAM, Low Power DDR (LPDDR), or Rambus Dynamic Random Access Memory (RDRAM).

Although FIG. 1 shows the buffer memory device 1300 included in the memory system 1000, the present disclosure is not limited thereto. That is, the memory system 1000 may not include the buffer memory device 1300. Instead, the buffer memory device 1300 may be provided externally to the memory system 1000.

The host 2000 may include a host buffer memory 2100. For example, as for a PCIe SSD, the host 2000 may define a command set in a particular form in order to describe operations. For example, a read command may be configured to include a host address, a logical address LA and a data size. In another example, a write command may be configured to include a host address, a logical address LA and a data size. The host address included in the write command may indicate the location of a memory space where data to be written to the host buffer memory 2100 is stored. In addition, the host address included in the read command may indicate a physical location of a memory space where the read data is stored in the host buffer memory. The host address may be referred to as a host physical address.

The host 2000 may designate the location of a data storage space where data is to be written or read by the logical address LA and at the same time, may determine the size of the data to be written or read. A minimum unit of the data to be written or read may be, for example, 512 B or 4 KB. The minimum unit may be fixed after the memory system 1000 is fabricated. The data size may be defined as N times the minimum unit, where N is a natural number. For example, when the minimum unit is 4 KB, the data size may be expressed as one 4 KB data, two 4 KB data, four 4 KB data, and the like. For example, 128 KB may be expressed as thirty-two 4 KB data. In other words, in terms of the write command, when the logical address LA of the data is '100' and the data size is the minimum unit, e.g., 4 KB, the data size may be expressed as 'WRITE(HostAddress, 0x100, 0)'.

In another example, in terms of the write command, when the logical address LA of the data is '100' and the data size is 32 times the minimum unit, e.g., 128 KB, the data size may be expressed as 'WRITE(HostAddress, 0x100, 31)'.

Figure 2:
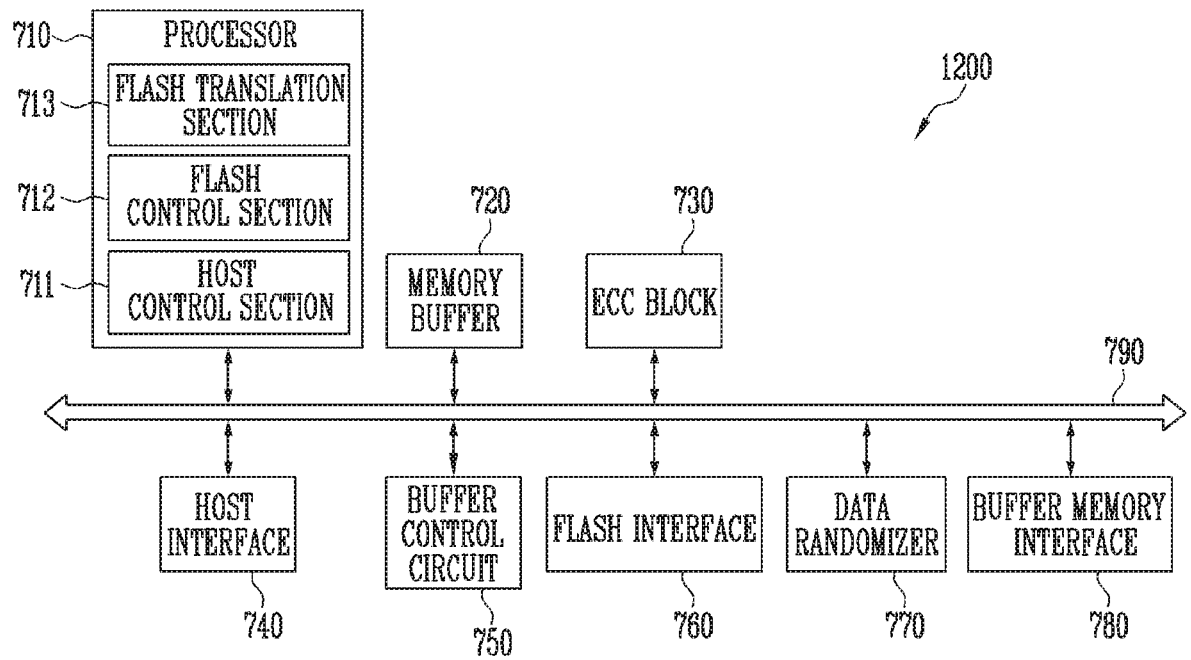
FIG. 2 is a diagram illustrating a memory controller shown in FIG.

FIG. 2 is a diagram illustrating the memory controller 1200 shown in FIG. 1.

Referring to FIG. 2, the memory controller 1200 may include a processor 710, a memory buffer 720, an error correction code (ECC) block 730, a host interface 740, a buffer control circuit 750, a non-volatile flash interface 760, a data randomizer 770, a buffer memory interface 780, and a bus 790.

The bus 790 may provide channels between components of the memory controller 1200.

The processor 710 may control the overall operation of the memory controller 1200 and perform a logical operation. The processor 710 may communicate with an external host 2000 through the host interface 740 and also communicate with the non-volatile memory device 1100 through the flash interface 760. Further, the processor 710 may communicate with the buffer memory device 1300 through the buffer memory interface 780. Further, the processor 710 may control the memory buffer 720 through the buffer control circuit 750. The processor 710 may control the operations of the memory system 1000 by using the memory buffer 720 as an operation memory, a cache memory, or a buffer memory.

The processor 710 may queue a plurality of commands input from the host 2000. This operation is called multi-queue. The processor 710 may sequentially transfer the plurality of queued commands to the non-volatile memory device 1100.

The memory buffer 720 may serve as an operation memory, a cache memory, or a buffer memory of the processor 710. The memory buffer 720 may store codes and commands executed by the processor 710. The memory buffer 720 may store data processed by the processor 710. The memory buffer 720 may include a static RAM (SRAM) or a dynamic RAM (DRAM).

The ECC block 730 may perform error correction. The ECC block 730 may perform ECC encoding based on data to be written to the non-volatile memory device 1100 through the flash interface 760. The ECC-encoded data may be transferred to the non-volatile memory device 1100 through the flash interface 760. The ECC block 730 may perform ECC decoding based on data received from the non-volatile memory device 1100 through the flash interface 760. For example, the ECC block 730 may be included as a component of the memory interface 760 in the flash interface 760.

The host interface 740 may communicate with the external host 2000 in response to control of the processor 710. The host interface 740 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Non-volatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 750 may control the memory buffer 720 under the control of the processor 710.

The flash interface 760 may communicate with the non-volatile memory device 1100 under the control of the processor 710. The flash interface 760 may transmit/receive commands, addresses, and data to/from the non-volatile memory device 1100 through a channel.

Although FIG. 2 shows the memory buffer 720 and the buffer control circuit 750 included in the memory controller 1200, the present disclosure is not limited thereto. That is, the memory controller 1200 may not include the memory buffer 720 and the buffer control circuit 750. Depending on system design, one or both of those components may be provided separately.

The processor 710 may control the operations of the memory controller 1200 using codes. The processor 710 may load codes from a non-volatile memory device (e.g., read only memory) provided in the memory controller 1200. For example, the processor 710 may load codes from the non-volatile memory device 1100 through the flash interface 760.

The data randomizer 770 may randomize data or de-randomize the randomized data. The data randomizer 770 may perform a data randomization operation on data to be written to the non-volatile memory device 1100 through the memory interface 760. The ECC-encoded data may be transferred to the non-volatile memory device 1100 through the flash interface 760. The data randomizer 770 may perform data de-randomization on the data received from the non-volatile memory device 1100 through the flash interface 760. For example, the data randomizer 770 may be included as a component of the flash interface 760.

The bus 790 of the memory controller 1200 may be divided into a control bus and a data bus. The data bus may be configured to transmit data in the memory controller 1200, and the control bus may be configured to transmit control information such as commands or addresses in the memory controller 1200. The data bus and the control bus may be isolated from each other, in order to not interfere with or influence each other. The data bus may be coupled to the host interface 740, the buffer control circuit 750, the ECC block 730, the flash interface 760, and the buffer memory interface 780. The control bus may be coupled to the host interface 740, the processor 710, the buffer control circuit 750, the flash interface 760, and the buffer memory interface 780. Although FIG. 2 shows the buffer memory device included in the memory controller 1200, the present disclosure is not limited thereto. That is, the memory controller 1200 may not include the buffer memory device 780, which may be provided separately.

The buffer memory interface 780 may communicate with the buffer memory device 1300 under the control of the processor 710. The buffer memory device 780 may transmit/receive commands, addresses, and data to/from the buffer memory device 1300 through a channel.

The memory system 1000 may receive a write command, write data, and a logical address from the host 2000. The memory controller 1200 may allocate a physical storage space of the non-volatile memory device 1100 in which the write data is stored, i.e., the memory block 110 or a page in response to the write command. In other words, the memory controller 1200 may map a physical address corresponding to the logical address in response to the write command. The physical address may be referred to as a flash logical address so that the physical address may be differentiated from the host physical address. The host physical address may correspond to a physical storage space of the non-volatile memory device 1100 in which write data received from the host 2000 is stored.

The memory system 1000 may store the above-described mapping information between the logical address and the physical address, i.e., the logical-physical address mapping information in the memory block 110 of the non-volatile memory device 1100. The memory block 110 storing the logical-physical address mapping information may be called a system block.

When the memory system 1000 is booted, the logical-physical address mapping information stored in the non-volatile memory device 1100 may be loaded to the buffer memory device 1300 or the memory buffer 720. In addition, the memory system 1000 may read the logical-physical address mapping information from the non-volatile memory device 1100 and store the read information in the buffer memory device 1300 or the memory buffer 720 to check the logical-physical address mapping information stored in the non-volatile memory device 1100. The buffer memory device 1300 and/or the memory buffer 720 may be individually or collectively referred to as a "controller buffer memory."

In another example, when the memory system 1000 receives the write command, the write data, and the logical address from the host 2000, the memory controller 1200 may allocate a physical storage space of the non-volatile memory device 1100 in which the write data is stored in response to the write command. In other words, in response to the write command, the memory controller 1200 may map a physical address corresponding to the logical address and update the buffer memory device 1300 or the memory buffer 720 with newly generated mapping information between the logical address and the physical address, i.e., logical-physical address mapping information. As described above, the physical address indicating the data storage space in the non-volatile memory device 1100 may be called a flash logical address.

The memory system 1000 may receive a read command and a logical address from the host 2000. The memory system 1000 may check a physical address corresponding to the logical address from the logical-physical address mapping information stored in the non-volatile memory device 1100, read data stored in a memory area corresponding to the checked physical address, and output the read data to the host 2000 in response to the read command.

The processor 710 may include a host control section 711, a flash control section 712, and a flash translation section 713.

The host control section 711 may control data transfer between the host 2000 and the host interface 740 and the controller buffer memory, i.e., the memory buffer 720 or the buffer memory device 1300. For example, the host control section 711 may control buffering data input from the host 2000 in the memory buffer 720 or the buffer memory device 1300 through the host interface 740. In another example, the host control section 711 may control outputting the data buffered in the memory buffer 720 or the buffer memory device 1300 to the host 2000 through the host interface 740.

For example, the host control section 711 may control fetching the data stored in the host buffer memory 2100 of the host 2000 and buffering the fetched data in the controller buffer memory. In addition, the host control section 711 may control outputting the data buffered in the controller buffer memory to the host buffer memory 2100 of the host 2000.

The flash control section 712 may control an operation of transferring the data buffered in the memory buffer 720 or the buffer memory device 1300 to the non-volatile memory device 1100 during a write operation. In another example, the flash control section 712 may control buffering data read and output from the non-volatile memory device 1100 into the memory buffer 720 or the buffer memory device 1300 during a read operation.

The flash translation section 713 may map a physical address corresponding to a logical address input from the host 2000 during a data write operation. The data may be written into a storage space corresponding to the mapped physical address in the non-volatile memory device 1100. The flash translation section 713 may check the physical address mapped to the logical address input from the host 2000 during the data write operation and may transfer the physical address to the flash control section 712. The flash control section 712 may read data from the storage space corresponding to the physical address in the non-volatile memory device 1100. The physical address indicating the storage space in the non-volatile memory device 1100 may be referred to as a flash physical address to be differentiated from a host physical address.

Figure 3:
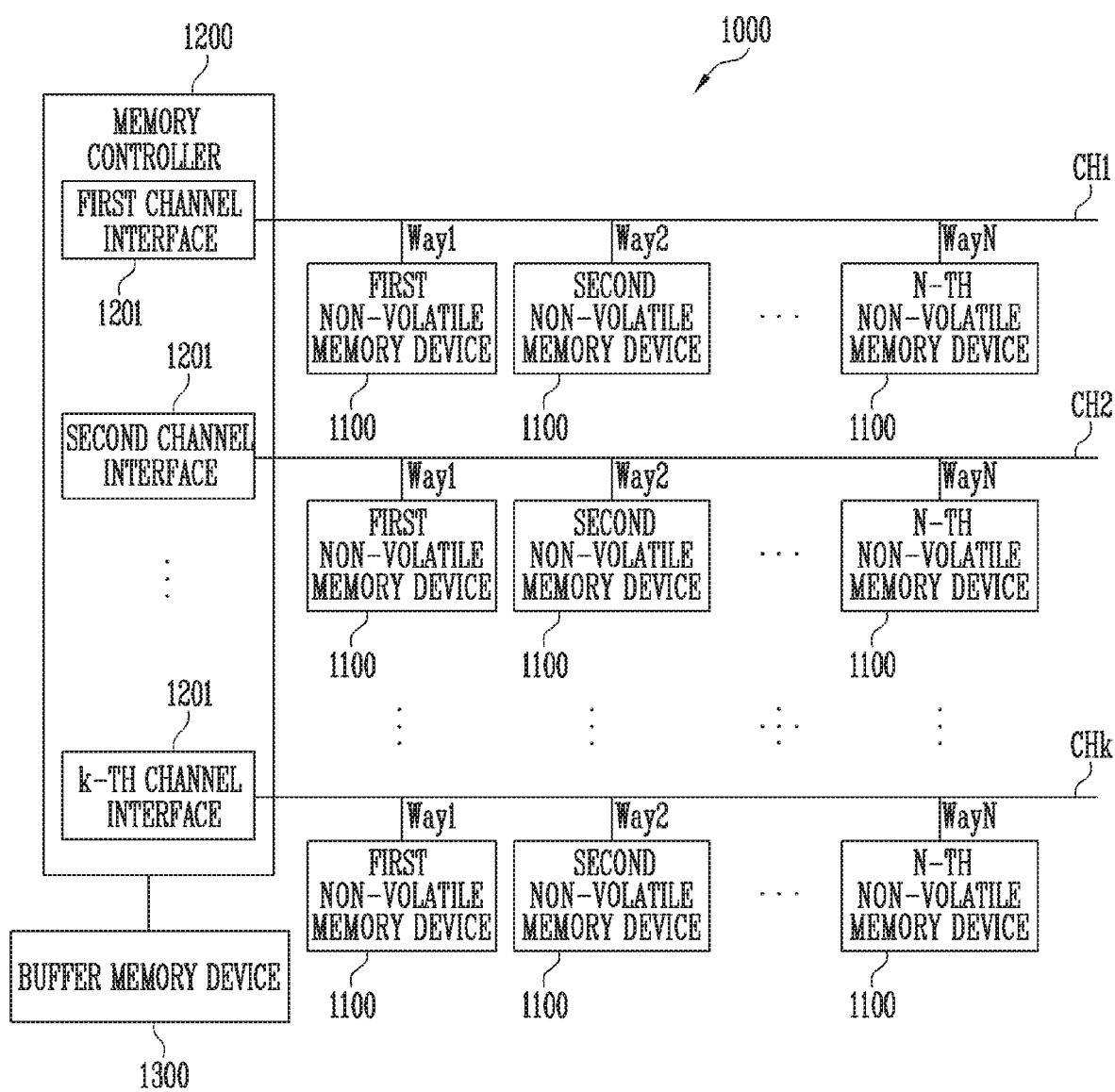
FIG. 3 is a diagram illustrating a memory system according to an embodiment.

FIG. 3 is a diagram illustrating the memory system 1000 according to an embodiment. More specifically, FIG. 3 illustrates the memory system 1000 including the memory controller 1200 and a plurality of non-volatile memory devices 1100 coupled to the memory controller 1200 through a plurality of channels CH1 to CHk.

Referring to FIG. 3, the memory controller 1200 may communicate with the plurality of non-volatile memory devices 1100 through the plurality of channels CH1 to CHk. The memory controller 1200 may include a plurality of channel interfaces 1201, and each of the channels CH1 to CHk may be coupled to one of the channel interfaces 1201. For example, the first channel CH1 may be coupled to the first channel interface 1201, the second channel CH2 may be coupled to the second channel interface 1201, and the k-th channel CHk may be coupled to the k-th channel interface 1201. Each of the channels CH1 to CHk may be coupled to one or more non-volatile memory devices 1100. In addition, non-volatile memory devices 1100 coupled to different channels may operate independently of each other. In other words, a non-volatile memory device 1100 coupled to the first channel CH1 and a non-volatile memory device 1100 coupled to the second channel CH2 may operate independently of each other. For example, the memory controller 1200 may exchange data or commands with a non-volatile memory device 1100, coupled to the second channel CH2, through CH2, while exchanging data or commands with a non-volatile memory device 1100, coupled to the first channel CH1, through CH1.

Each of the channels CH1 to CHk may be coupled to one or more non-volatile memory devices 1100. The plurality of non-volatile memory devices 1100 coupled to a single channel may respectively constitute different ways. For example, N non-volatile memory devices 1100 may be coupled to a single channel, and the respective non-volatile memory devices 1100 may configure in N different ways. That is, the first to N-th memory devices 1100 may be coupled to the first channel CH1. The first memory device 1100 may configure a first way Way1, the second memory device 1100 may configure a second way Way2, and the N-th memory device 1100 may configure an N-th way WayN. Alternatively, two or more non-volatile memory devices 1100 coupled to the same channel may constitute a single way.

Since the first to Nth non-volatile memory devices 1100 coupled to CH1 share CH1, these memory devices may sequentially exchange data or commands with the memory controller 1200, but not simultaneously in parallel. In other words, when the memory controller 1200 transmits data to the first, Way1-configured non-volatile memory device 1100 of CH1 through CH1, the second to N-th non-volatile memory devices 1100 configuring the second to N-th ways Way2 to WayN of CH1 may not exchange data or commands with the memory controller 1200 through CH1. That is, when one of the first to N-th non-volatile memory devices 1100 sharing CH1 occupies CH1, the other non-volatile memory devices 1100 coupled to CH1 may not use CH1.

However, the first Way1-configured non-volatile memory device 1100 of CH1 and the first Way1-configured non-volatile memory device 1100 of CH2 may communicate with the memory controller 1200 independent of each other. In other words, the memory controller 1200 may exchange data with the first Way1-configured non-volatile memory device 1100 of CH2 through both CH2 and the second channel interface 1201 while the first Way1-configured non-volatile memory device 1100 of CH1 exchanges data with the memory controller 1200 through both CH1 and the first channel interface 1201.

Figure 4:
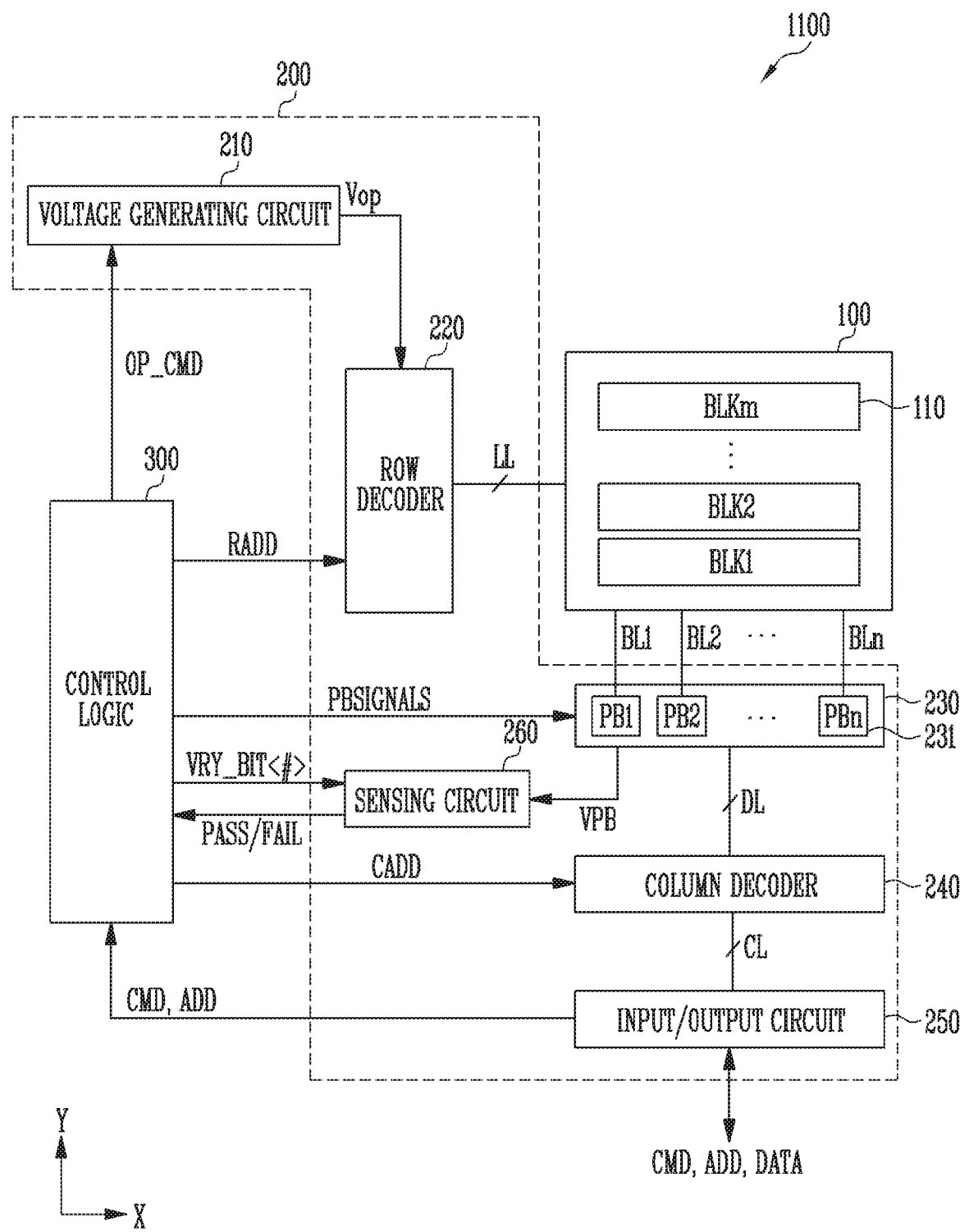
FIG. 4 is a diagram illustrating a non-volatile memory device shown in FIG. 1.

FIG. 4 is a diagram illustrating the non-volatile memory device 1100 shown in FIG.

Referring to FIG. 4, the non-volatile memory device 1100 may include a memory cell array 100 that stores data therein. The non-volatile memory device 1100 may include peripheral circuits 200 configured to perform a program operation to store data in the memory cell array 100, a read operation to output the stored data, and an erase operation to erase the stored data. The non-volatile memory device 1100 may include a control logic 300 that controls the peripheral circuits 200 in response to control of the memory controller 1200 shown in FIG. 1.

The memory cell array 100 may include a plurality of memory blocks BLK1 to BLKm 110, where m is a positive integer. Local lines LL and bit lines BL1 to BLn may be coupled to each of the memory blocks BLK1 to BLKm 110, where n is a positive integer. For example, the local lines LL may include a first select line, a second select line, and a plurality of word lines arranged between the first and second select lines. In addition, the local lines LL may include dummy lines arranged between the first select line and the word lines and between the second select line and the word lines. The first select line may be a source select line, and the second select line may be a drain select line. For example, the local lines LL may include word lines, drain and source select lines, and source lines. For example, the local lines LL may further include dummy lines. For example, the local lines LL may further include pipe lines. The local lines LL may be coupled to the memory blocks BLK1 to BLKm 110, respectively, and the bit lines BL1 to BLn may be coupled in common to the memory blocks BLK1 to BLKm 110. The memory blocks BLK1 to BLKm 110 may have a two-dimensional (2D) or three-dimensional (3D) structure. For example, in the 2D memory blocks 110, memory cells may be arranged in parallel with a substrate. For example, in the 3D memory blocks 110, memory cells may be stacked in a vertical direction to the substrate.

The peripheral circuits 200 may perform program, read, and erase operations on the selected memory block 110 in response to control of the control logic 300. For example, the control logic 300 may control the peripheral circuits 200 to supply a verify voltage and pass voltages to the first select line, the second select line, and the word lines, may selectively discharge the first select line, the second select line and the word lines, and may verify memory cells coupled to a selected word line, among the word lines. For example, the peripheral circuits 200 may include a voltage generating circuit 210, a row decoder 220, a page buffer group 230, a column decoder 240, an input/output circuit 250, and a sensing circuit 260.

The voltage generating circuit 210 may generate various operating voltages Vop used to perform program, read, and erase operations in response to an operation signal OP_CMD. In addition, the voltage generating circuit 210 may selectively discharge the local lines LL in response to the operation signal OP_CMD. For example, the control logic 300 may control the voltage generating circuit 210 to generate a program voltage, a verify voltage, pass voltages, a turn on voltage, a read voltage, an erase voltage, and a source line voltage.

The row decoder 220 may transfer the operating voltages Vop to the local lines LL coupled to the selected memory block 110 in response to a row address RADD.

The page buffer group 230 may include a plurality of page buffers PB1 to PBn 231 coupled to the bit lines BL1 to BLn. The page buffers PB1 to PBn 231 may operate in response to page buffer control signals PBSIGNALS. For example, the page buffers PB1 to PBn 231 may temporarily store data received through the bit lines BL1 to BLn, respectively, or may sense voltages or currents in the bit lines BL1 to BLn during a read or verify operation.

The column decoder 240 may transfer data between the input/output circuit 250 and the page buffer group 230 in response to a column address CADD. For example, the column decoder 240 may exchange data with the page buffers 231 through data lines DL, or may exchange data with the input/output circuit 250 through column lines CL.

The input/output circuit 250 may transfer a command CMD and the address ADD from the memory controller 1200 shown in FIG. 1 to the control logic 300, or may exchange data DATA with the column decoder 240.

The sensing circuit 260 may generate a reference current in response to an allowable bit VRY_BIT<#> and compare a sensing voltage VPB received from the page buffer group 230 with a reference voltage generated by the reference current to output a pass signal PASS or a fail signal FAIL during a read operation or a verify operation.

The control logic 300 may output the operation signal OP_CMD, the row address RADD, the page buffer control signals PBSIGNALS and the allowable bit VRY_BIT<#> to control the peripheral circuits 200 in response to the command CMD and the address ADD. In addition, the control logic 300 may determine whether a verify operation passes or fails in response to the pass or fail signal PASS or FAIL.

In terms of the operations of the non-volatile memory device 1100, each memory block 110 may be the unit of an erase operation. In other words, a plurality of memory cells in a single memory block 110 may be simultaneously erased, but may not be selectively erased.

Figure 5:
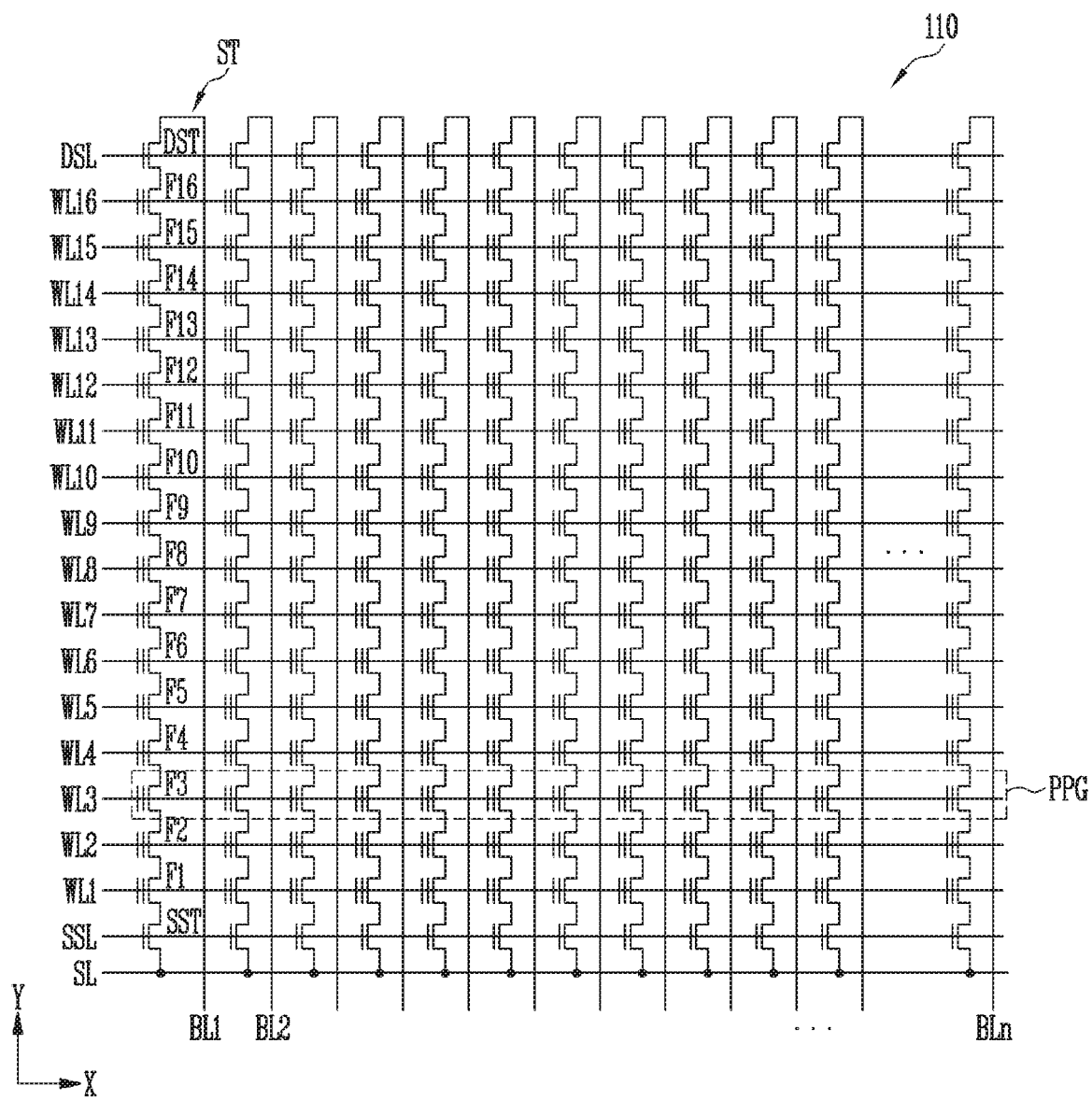
FIG. 5 is a diagram illustrating a memory block shown in FIG. 4.

FIG. 5 is a diagram illustrating a memory block 110 among the plurality of memory blocks BLK1 to BLKm 110 shown in FIG. 4.

Referring to FIG. 5, the memory block 110 may be configured such that a plurality of word lines arranged in parallel may be coupled between a first select line and a second select line. The first select line may be a source select line SSL and the second select line may be a drain select line DSL. More specifically, the memory block 110 may include a plurality of strings ST coupled between the bit lines BL1 to BLn and a source line SL. Each of the bit lines BL1 to BLn may be coupled to each of the strings ST, and the source line SL may be commonly coupled to the strings ST. Since the strings ST may have the same configuration, the string ST coupled to the first bit line BL1 will be described in detail as an example.

The string ST may include a source selection transistor SST, a plurality of memory cells F1 to F16, and a drain selection transistor DST coupled in series between the source line SL and the first bit line BL1. A single string ST may include at least one source select transistor SST and at least one drain select transistors DST, and may include more memory cells than the memory cells F1 to F16 as shown in FIG. 5.

A source of the source selection transistor SST may be coupled to the source line SL, and a drain of the drain selection transistor DST may be coupled to the first bit line BL1. The memory cells F1 to F16 may be coupled in series between the source selection transistor SST and the drain selection transistor DST. Gates of the source selection transistors SST in different strings ST may be coupled to the source select line SSL, gates of the drain selection transistors DST may be coupled to the drain select line DSL, and gates of the memory cells F1 to F16 may be coupled to a plurality of word lines WL1 to WL16. A group of memory cells coupled to the same word line, among memory cells in different strings ST, may be referred to as a physical page PPG. Therefore, the memory block 110 may include as many physical pages PPG as the number of word lines WL1 to WL16.

A single memory cell may store one bit of data. This memory cell is generally called a single level cell (SLC). A single physical page PPG may store data corresponding to a single logical page LPG. Data corresponding to the single logical page LPG may include as many data bits as the number of cells in the single physical page PPG. Further, a single memory cell MC may store two or more bits of data. This cell is typically referred to as a "multi-level cell (MLC)". The single physical page PPG may store data corresponding to two or more logical pages LPG.

When a memory cell stores 2-bit data, a single physical page PPG may include two pages PG. One page PG may store data of one logical page LPG. One memory cell may include one of a plurality of threshold voltages depending on data, and a plurality of pages PG in one physical page PPG may be represented as differences in threshold voltage.

A plurality of memory cells in one physical page PPG may be simultaneously programmed. In other words, the non-volatile memory device 1100 may perform a program operation on each physical page PPG. A plurality of memory cells in a single memory block may be simultaneously erased. In other words, the non-volatile memory device 1100 may perform an erase operation on each memory block 110. For example, in order to update a portion of data stored in one memory block 110, the entire data stored in the memory block 110 may be read, the portion of the data to be updated may be changed, and another memory block 110 may be programmed with the entire data.

Figure 6:
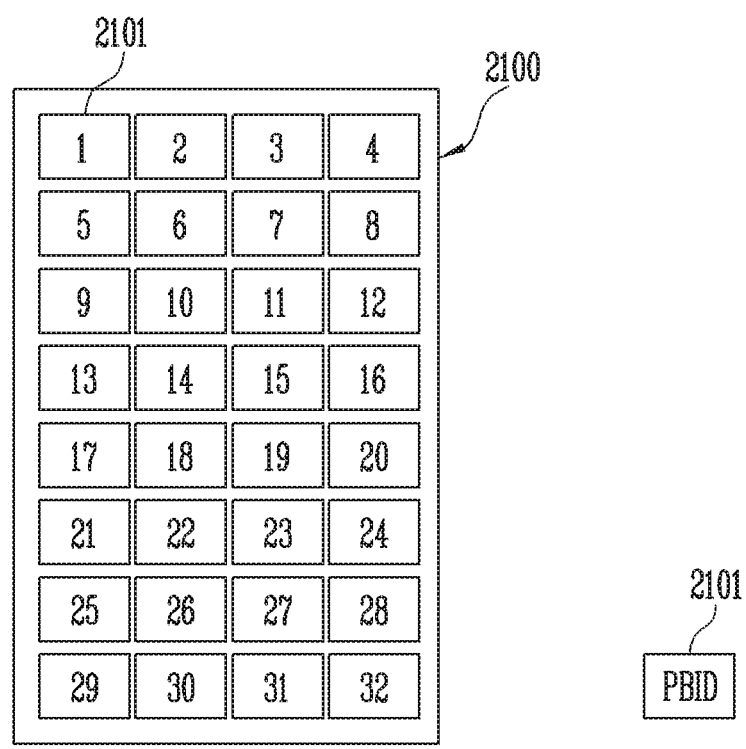
FIG. 6 is a detailed diagram of operations of a host buffer memory according to an embodiment.

FIG. 6 is a detailed diagram illustrating operations of the host buffer memory 2100 shown in FIG. 1 in accordance with an embodiment.

Referring to FIG. 6, the host buffer memory 2100 may include a plurality of host buffer units 2101. For example, the host buffer unit 2101 may have a memory size capable of storing 512 bytes or 4 KB. For example, the host buffer memory 2100 may be formed as a DRAM.

A physical buffer ID PBID may be given to each of the plurality of host buffer units 2101 in the host buffer memory 2100. For example, when the host buffer memory 2100 includes thirty-two host buffer units 2101, the thirty-two host buffer units 2101 may be given 1 to 32 physical buffer IDs PBIDs, respectively. The physical buffer ID PBID may be a representation of a host physical address HPA by using a simple natural number.

The host 2000 may define a command set in a particular form in order to describe operations. For example, a read command may be configured to include a host address, a logical address LA and a data size. The host address of the read command may indicate the host buffer unit 2101 in the host buffer memory 2100 in which data output by a read operation of the memory system 1000 will be stored. The host address may indicate a physical memory space of the host buffer memory 2100 in which data is stored, or a physical memory space in which data will be stored. The host address may be referred to as the host physical address HPA.

In another example, a write command may be configured to include a host address, a logical address LA, and a data size. The host address of the write command may indicate the host buffer unit 2101 in the host buffer memory 2100 in which data to be written into the memory system 1000 is stored.

The host 2000 may not be capable of a single big data transfer, i.e., a single host address may not represent a plurality of sequential addresses in a single command. The host 2000 may manage the host buffer memory 2100 in such a manner that divides the host buffer memory 2100 into the plurality of host buffer units 2101 and allocates the plurality of host buffer units 2101 for storing or extracting data in units of single host buffer units 2101. In other words, a single host address may correspond to a single host buffer unit 2101. That is, a single input/output process may correspond to a single host buffer unit 2101.

For example, when the host buffer unit 2101 has a size of 4 KB, in order to express a sequential read command for 128 KB data or a sequential write command for 128 KB data, the host 2000 may express the corresponding command by using host addresses corresponding to a total of the thirty-two host buffer units 2101. Each of the host buffer units 2101 may include non-linear addresses on the host buffer memory 2100, i.e., discontinuous and scattered addresses. In this example, in order to express the sequential read command for 128 KB data or the sequential write command for 128 KB data, pointers for the thirty-two host buffer units 2101 may be added to the command. This may be referred to as a physical region page (PRP) method. When the memory system 1000 directly uses a host address indicating a physical storage space in the host buffer memory 2100 of the host 2000, an address on the host 2000 may be transferred to the memory system 1000 by using a scatter-gather list (SGL) method in addition to the above-described PRP method.

For example, in order to express 128 KB sequential data for a read command or a write command, thirty-two pointers indicating a PRP list including physical region pages (PRPs) for thirty-two host buffer units 2101, each corresponding to 4 KB data of the 128 KB, may be designated in the host address field in the read or write command. When the memory system 1000 processes the corresponding command, the memory system 1000 may fetch the PRP list based on the host addresses and individually manage the thirty-two physical region pages PRP, i.e., the addresses of the host buffer units 2101.

Since the addresses of the thirty-two host buffer units 2101 are expressed as a list with respect to a single command, the memory system 1000 may analyze one PRP address, i.e., a host physical address HPA for transferring the 4 KB data stored in each of the host buffer units 2101. In terms of a write command, this PRP address may be used as a source address. In addition, the memory system 1000 may analyze one PRP address so as to transfer 4 KB data to be stored in each of the host buffer units 2101. In terms of a read command, this PRP address may be used as a destination address. In terms of the host 2000, random address of 4 KB may make it difficult to linearly allocate addresses in the memory system 1000. As a result, the memory system 1000 may have to calculate each address, which may degrade performance.

Figure 7:
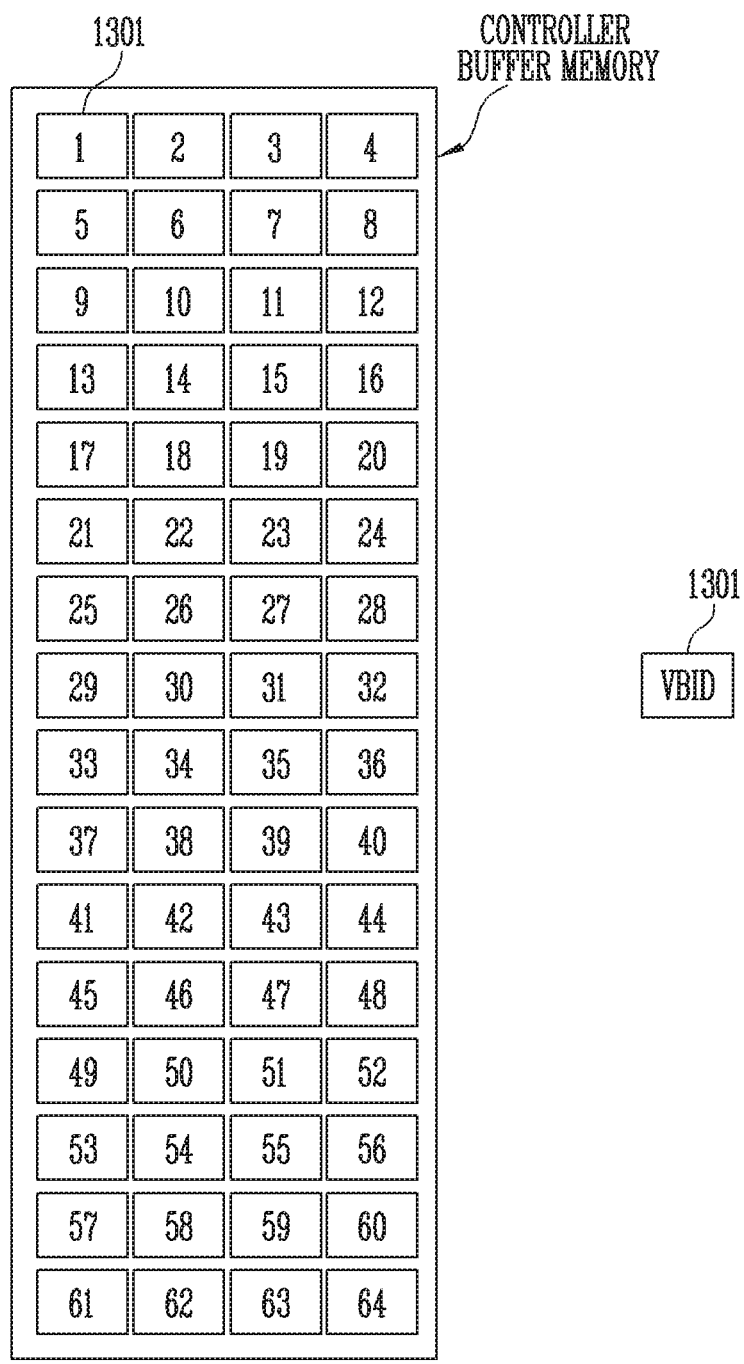
FIG. 7 is a diagram illustrating operations of a controller buffer memory according to an embodiment.

FIG. 7 is a detailed diagram of a controller buffer memory in accordance with an embodiment.

Referring to FIG. 7, the controller buffer memory, i.e., the buffer memory device 1300 and/or the memory buffer 720, may include a plurality of controller buffer units 1301. Each of the controller buffer units 1301 may include a memory space storing data of the same size as the host buffer unit 2101. One input/output process may correspond to one host buffer unit 2101, and similarly, one input/output process may correspond to one controller buffer unit 1301.

A virtual buffer ID VBID may be given to each of the plurality controller buffer units 1301 in the controller buffer memory. For example, when the controller buffer memory includes sixty-four controller buffer units 1301, 1 to 64 virtual buffer IDs VBIDs may be given to the sixty four controller buffer units 1301, respectively. The virtual buffer ID VBID may be a representation of a virtual address VA indicating a plurality of controller buffer units 1301 in the controller buffer memory by using a simple natural number.

Figure 8:
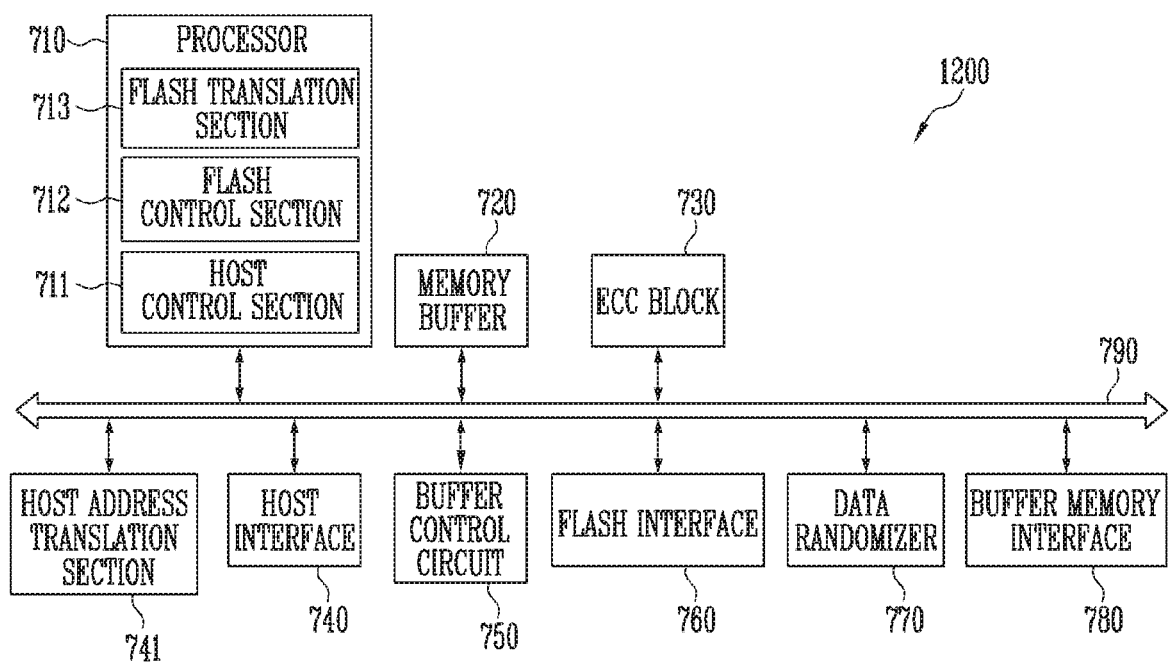
FIG. 8 is a diagram illustrating a memory controller according to an embodiment.

FIG. 8 is a diagram illustrating a memory controller 1200 according to an embodiment. In addition, FIG. 9 is a diagram illustrating an address mapping method according to an embodiment.

Referring to FIGS. 8 and 9, the memory controller 1200 may further include a host address translation section 741, in addition to the memory controller 1200 described in FIG. 2. The host address translation section 741 may map non-linear host physical addresses provided by the host 2000 to linear virtual addresses. Non-linear host physical addresses may refer to discontinuous and scattered host physical addresses. Linear virtual addresses may refer to continuous and sequentially increasing virtual addresses.

As described above, when the host address translation section 741 maps non-linear host physical addresses to linear virtual addresses, linear addresses corresponding to data may be designated by a start address and a size of the data, and the host 2000 may not separately perform fragmentation. In addition, while managing the host buffer unit 2101, i.e., data may be managed in a unit of, for example, 4 KB, a plurality of descriptors or a linked list may not be separately managed. Accordingly, performance degradation of the memory system 1000 may be prevented.

For example, the memory controller 1200 may include the host address translation section 741 and the host buffer memory 2100 of the host 2000 may include N host buffer units 2101, where N is a natural number of 2 or more. Each of the N host buffer units 2101 of the host buffer memory 2100 may be identified by a host physical address HPA. The host physical address HPA may refer to a physical address for each of the N host buffer units 2101 of the host buffer memory 2100.

Each of the N host buffer units 2101 may be designated at the time when a command is issued, occupied for a predetermined time, and be released in response to completion of processing the command. In other words, the request and the release of each of the host buffer units 2101 may be completely randomly performed in terms of the host physical address HPA.

A write operation and a read operation of the memory controller 1200 may be very efficiently performed when it is possible to represent 128 KB data with consecutive addresses and one host physical address HPA serving as a start address. A write or read operation on a large amount of data corresponding to consecutive addresses may be performed at a higher rate than on such data consisting of small data corresponding to random addresses. In other words, a write operation and a read operation of the memory controller 1200 may be very efficiently performed when data are represented as consecutive addresses in terms of configuration of a list of the host physical addresses HPA.

The host address translation section 741 may translate the host physical address HPA into the virtual address VA. A command that the host interface 740 receives from the host 2000 may include host physical addresses HPAs, and the host address translation section 741 may detect the host physical addresses HPAs from the command. In addition, the host address translation section 741 may allocate virtual addresses VAs for the host physical addresses HPAs and transfer the allocated virtual addresses VAs to the processor 710. A start virtual address VA may be allocated for the command input from the host 2000. The host address translation section 741 may allocate each one of the virtual addresses VAs to a corresponding one of the host physical addresses HPAs. The host physical addresses HPAs may be non-linear, i.e., discontinuous scattered addresses, and the virtual addresses VAs may be linear addresses, i.e., continuous and sequentially increasing addresses. For example, a virtual buffer ID VBID representing a virtual address with a simple natural number may start from and increase by 1 with respect to each address of the physical region page PRP. When the virtual buffer ID VBID reaches the last virtual address VA, the virtual buffer ID VBID may roll back to '1'. In other words, the host address translation section 741 may map non-linear host physical addresses HPAs input from the host 2000 to linear virtual addresses VAs.

When write operations of 4 KB data units, each corresponding to one host buffer unit 2101, are ordered, host physical addresses HPAs may be random physical addresses for the plurality of host buffer units 2101 forming the host buffer memory 2100 of the host 2000. However, the plurality of 4 KB data units stored in the actual host buffer memory 2100 may have a semantic or inherent order, which may be represented by the virtual address VA.

For example, during a write operation, when the host interface 740 receives a write command from the host 2000 and responds to the write command, the host interface 740 may load write data to be written, which is stored in the host buffer memory 2100, to the memory buffer 720 or the buffer memory device 1300. When the write data input from the host 2000 has a size of 32 KB, a memory space of 32 KB in the host buffer memory 2100, i.e., eight host buffer units 2101 of 4 KB may be allocated for the write data, and these host buffer units may correspond to eight physical buffer IDs PBIDs. When eight physical region pages PRP of the host 200 allocated in the host buffer memory 2100, i.e., the eight host buffer units 2101 are {4 KB×7, 4 KB×0, 4 KB×1, 4 KB×4, 4 KB×2, 4 KB×6, 4 KB×5, 4 KB×3}, the eight physical buffer IDs PBIDs may be expressed as {0x7, 0x0, 0x1, 0x4, 0x2, 0x6, 0x5, 0x3}. For example, host physical address HPA corresponding to the eight physical buffer IDs PBID may be 'E000', '0', '2000', '8000', '4000', 'C000', 'A000', '6000'.

When sequentially numbering the eight host buffer units 2101 for a corresponding write command, the write command may be defined as an operation consisting of N sequences starting from the PRP having a value of 7*4K. In other words, PRP having a value of 7*4K may correspond to the first sequence of the write command, PRP having a value of 0*4K may correspond to the second sequence of the write command, and PRP having a value of 1*4K may correspond to the third sequence of the write command. Continuous buffer space may be designated in the memory buffer 720 or the buffer memory device 1300 when each PRP is sequentially numbered according to each sequence. This sequence numbering may be a virtual address VA or a virtual address ID VBID. As a result, the host address translation section 741 may generate and manage a virtual-physical address mapping table. For example, the virtual address VA corresponding to the virtual buffer ID VBID having a value of 2 may be '2000'.

As described above, the host address translation section 741 may order and manage the sequences with respect to write commands transferred from the host interface 740. When buffer space in the memory buffer 720 and the buffer memory device 1300 is detected with these sequences, the host interface 740 and the processor 710 may obtain information about the entire buffer space if only information about the first buffer space in the memory buffer 720 or the buffer memory device 1300 with respect to the write commands is shared.

Referring to FIG. 9, in a table where non-linear host physical addresses HPAs are mapped to linear virtual addresses VAs, the host buffer memory 2100 of the host 2000 may include eight host buffer units 2101. The physical buffer ID PBID may correspond to a host physical address HPA with respect to the first to eighth host buffer units 2101, and the virtual buffer ID VBID may have a value from 1 to 16. When the physical buffer ID PBID having a value of 8 is allocated at a time to, a virtual buffer ID VBID having a value of 1 may be allocated. When the physical buffer ID PBID having a value of 1 is allocated at a time t1, a virtual buffer ID VBID having a value of 2 may be allocated. The host physical address HPA may indicate a physical address representing the actual physical buffer space in the host buffer memory 2100. In addition, the virtual address VA may indicate a physical address representing the actual physical buffer space in the memory buffer 720 or the buffer memory device 1300.

As described above, a write operation may be efficiently performed in the memory system 1000 by mapping non-linear host physical addresses HPAs on the host buffer memory 2100 to linear virtual addresses VAs on the memory buffer 720 or the buffer memory device 1300. In other words, the memory system 1000 may program pages represented by continuous addresses in the non-volatile memory device 1100 with write data buffered in the memory buffer 720 or the buffer memory device 1300 by using a sequential program algorithm. As a result, performance of the program operation may be improved.

Figure 10:
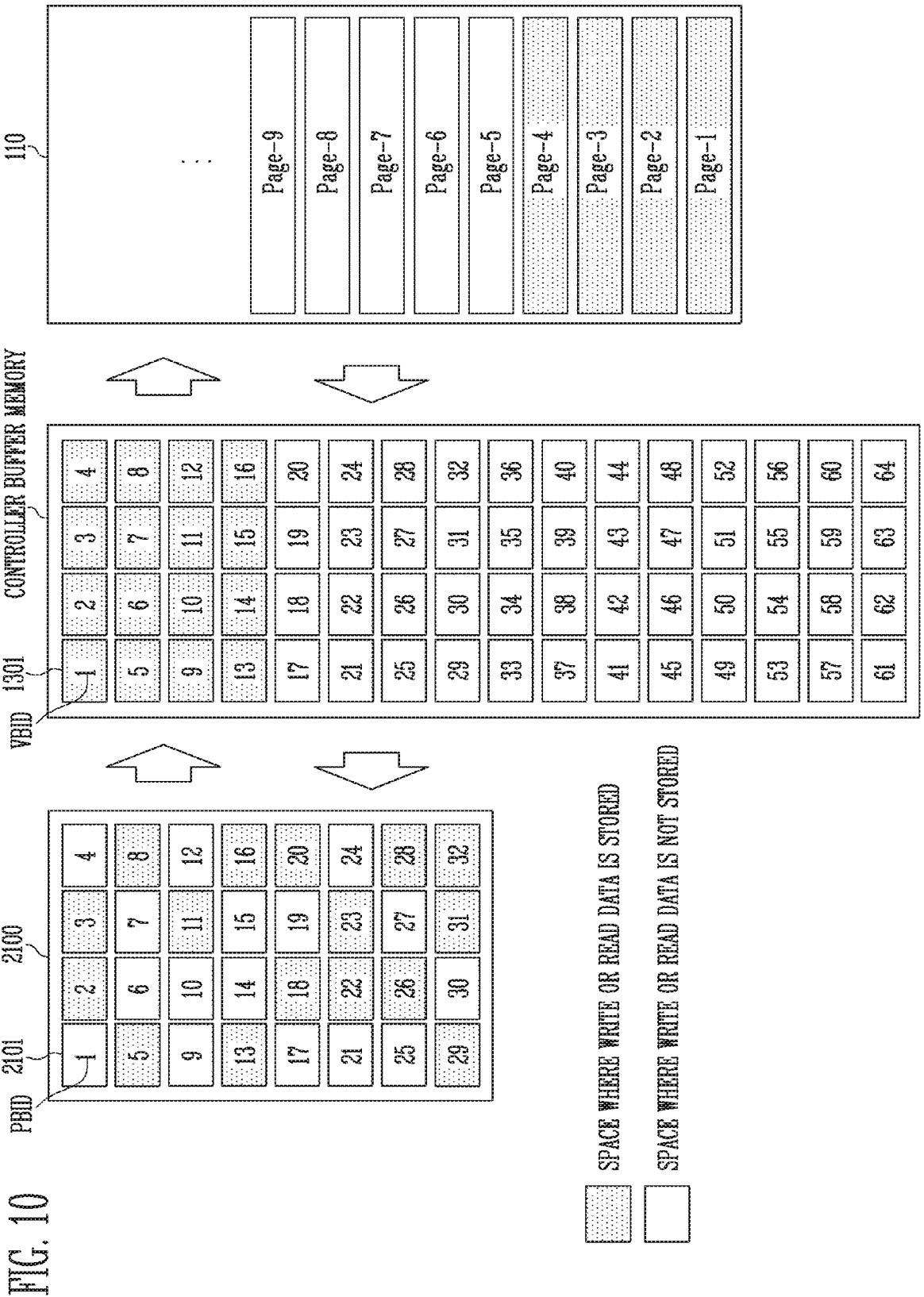
FIG. 10 is a diagram illustrating a data write and read method by linear virtual address mapping according to an embodiment.

FIG. 10 is a diagram illustrating a data write and read method by mapping a linear virtual address according to an embodiment.

Referring to FIG. 10, write data may be stored in a scattered manner in the plurality of host buffer units 2101 of the host buffer memory 2100. When the host 2000 inputs a write command to the memory system 1000, host physical addresses HPAs corresponding to the host buffer units 2101 storing the write data may be non-linear addresses. For example, each of the host buffer units 2101 may include a memory space storing 4 KB data, and the write data may be 128 KB. For example, the 128 KB write data may be stored in a scattered manner in the host buffer units 2101 corresponding to the physical buffer IDs PBIDs having values of 2, 3, 5, 8, 11, 13, 16, 18, 20, 22, 23, 26, 28, 29, 31, and 32.

The host address translation section 741 of the memory controller 1200 may map the non-linear host physical addresses HPAs to linear virtual addresses VAs. In other words, the host address translation section 741 may map discontinuous and scattered physical buffer IDs PBIDs corresponding to the host buffer units 2101 storing the write data to consecutive virtual buffers IDs VBIDs, and may generate or update the virtual-physical address mapping table.

The host control section 711 of the memory controller 1200 may then fetch the write data stored in the host buffer units 2101 of the host buffer memory 2100 based on the non-linear host physical addresses HPAs or the physical buffer IDs PBIDs, and may buffer the fetched write data in the controller buffer units 1301 of the controller buffer memory (i.e., the memory buffer 720 and/or the buffer memory device 1300) based on the linear virtual addresses VAs or the virtual buffer IDs VBIDs. Since the virtual addresses VAs are linear addresses, the write data may be buffered in the controller buffer units 1301 corresponding to the sequential virtual buffer IDs VBIDs. For example, the write data stored in a scattered manner in the host buffer units 2101 corresponding to physical buffer IDs PBIDs having the discontinuous and scattered values of 2, 3, 5, 8, 11, 13, 16, 18, 20, 22, 23, 26, 28, 29, 31, and 32 may be buffered in sixteen controller buffer units 1301 corresponding to virtual buffer IDs VBIDs having consecutive values of 1 to 16.

The memory system 1000 may perform a program operation on the memory block 110 of the non-volatile memory device 1100 with the write data stored in the controller buffer units 1301 of the controller buffer memory. The flash translation section 713 may map a logical address received from the host 2000 to a flash physical address, and may generate or update the logical-physical address mapping table.

The flash control section 712 may program the write data stored in the controller buffer memory into a page corresponding to the flash physical address mapped to the logical address received from the host 2000 in the non-volatile memory device 1100. Since the write data stored in the controller buffer memory is a large amount of data corresponding to consecutive addresses, the flash control section 712 may program the write data into pages represented by sequential addresses in the non-volatile memory device 1100 by using a sequential program algorithm. For example, 16 KB write data corresponding to VBIDs having values of 1 to 4 may be stored in a first page Page-1, 16 KB write data corresponding to VBIDs having values of 5 to 8 may be stored in a second page Page-2, 16 KB write data corresponding to VBIDs having values of 9 to 12 may be stored in a third page Page-3, and 16 KB write data corresponding to VBIDs having values of 13 to 16 may be stored in a fourth page Page-4.

The memory system 1000 may receive a read command for reading the data stored in the first to fourth pages (Page1 to Page4) of the non-volatile memory device 1100 from the host 2000. The flash translation section 713 of the memory controller 1200 may check the flash physical address mapped to the logical address input from the host 2000 and confirm that read data is stored in Page1 to Page4 of the non-volatile memory device 1100.

The flash control section 712 may read the read data from Page1 to Page4 of the non-volatile memory device 1100 based on the logical-physical address mapping information and may buffer the read data in the controller buffer memory. The flash control section 712 may assign sixteen controller buffer units 1301 in the controller buffer memory for the read data based on the virtual-physical address mapping table. Since the read data stored in the non-volatile memory device 1100 is a large amount of data corresponding to sequential addresses, the flash control section 712 may read the read data from the non-volatile memory device 1100 by using a sequential read algorithm and may buffer the read data in the sixteen controller buffer units 1301 corresponding to sequential virtual buffer IDs VBIDs.

The host control section 711 may output the read data from the sixteen controller buffer units 1301 corresponding to the sequential virtual buffer IDs VBIDs to the host buffer units 1291 corresponding to scattered addresses in the host buffer memory 2100.

As described above, a write operation may be efficiently performed in the memory system 1000 by mapping non-linear host physical addresses HPAs on the host buffer memory 2100 to linear virtual addresses VAs on the memory buffer 720 or the buffer memory device 1300. In other words, the memory system 1000 may perform a program operation to pages corresponding to sequential addresses in the non-volatile memory device 1100 with write data buffered in the memory buffer 720 or the buffer memory device 1300 by using a sequential program algorithm. As a result, performance of the program operation may be improved. In addition, the memory system 1000 may read the data from the pages corresponding to the sequential addresses in the non-volatile memory device 1100 by using a sequential read algorithm, so that performance of a read operation may be improved.

Figure 11:
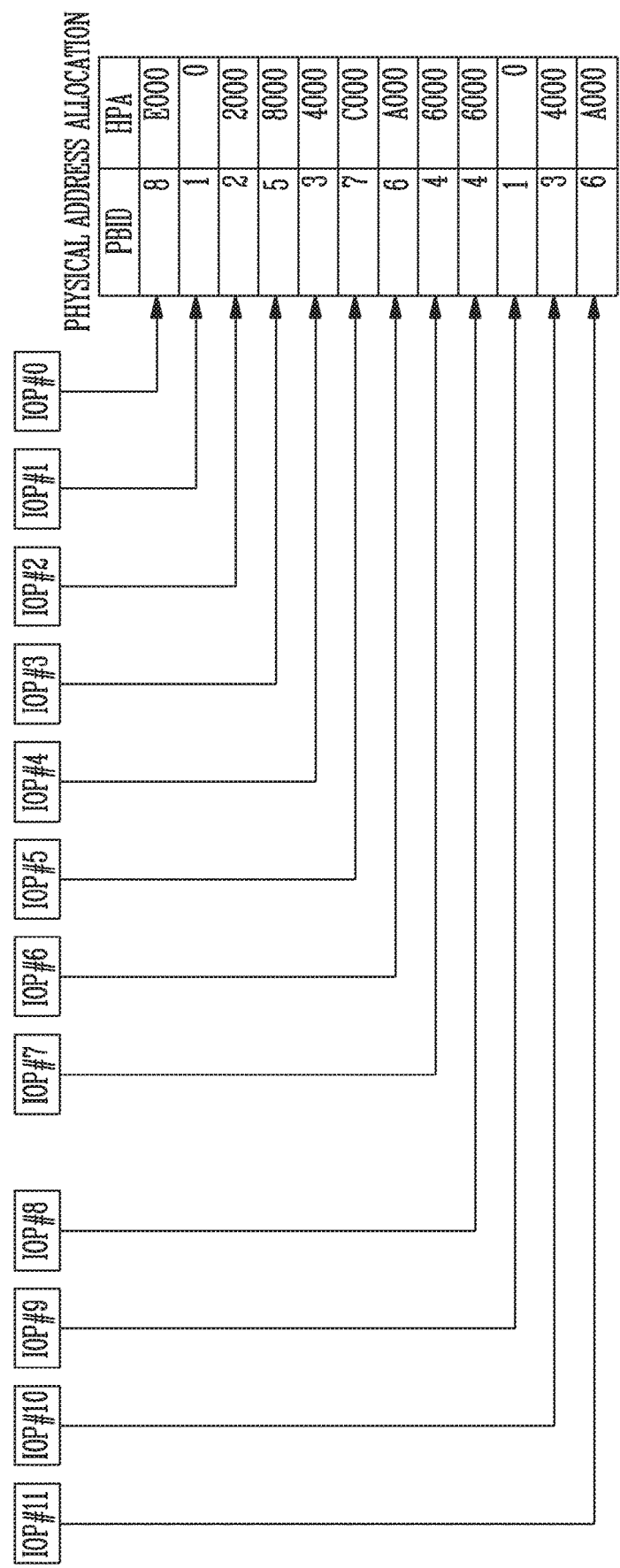
FIG. 11 is a diagram illustrating a method of allocating a host buffer unit to an input/output process according to an embodiment.
Figure 12:
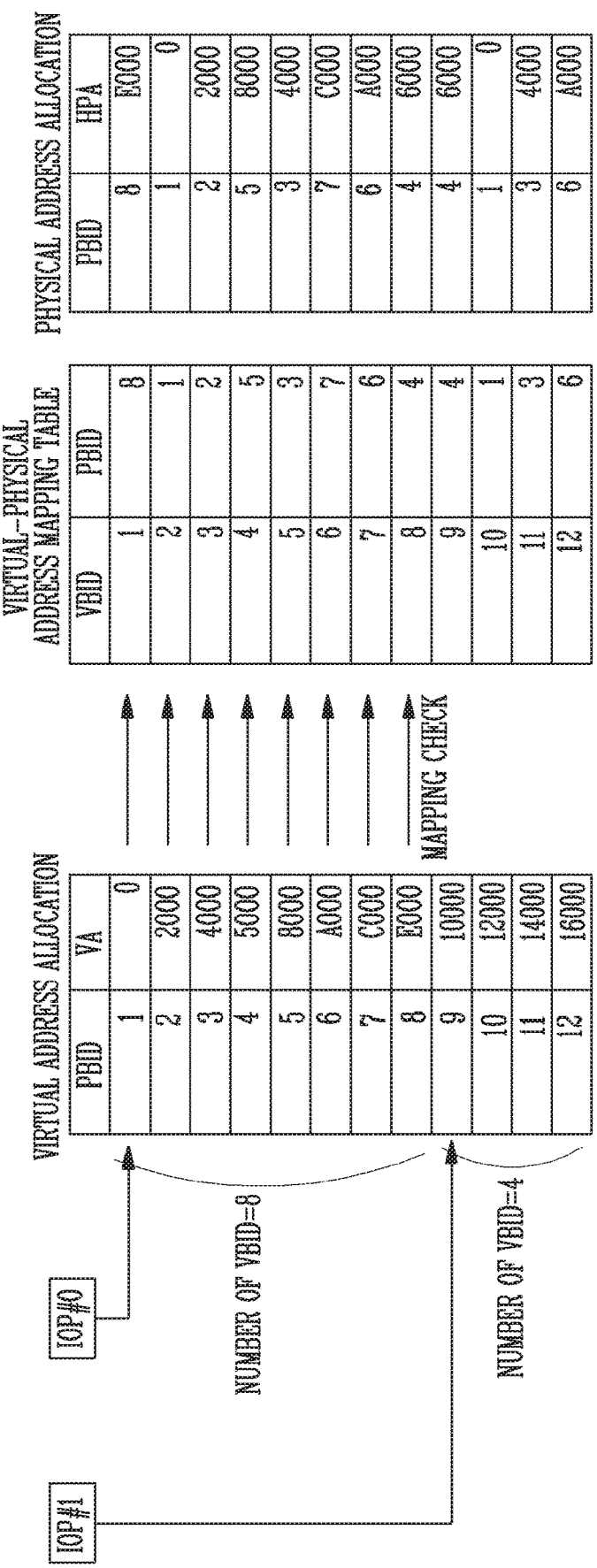
FIG. 12 is a diagram illustrating a method of allocating a virtual address to an input/output process according to an embodiment.

FIG. 11 is a diagram illustrating a method of allocating a host buffer unit for an input/output process according to an embodiment. FIG. 12 is a diagram illustrating a method of allocating a virtual address for an input/output process according to an embodiment.

Referring to FIG. 11, when a plurality of input/output (IO) processes (IOP) are generated, the host 2000 may allocate one of the plurality of host buffer units 2101 in the host buffer memory 2100 to a respective one of the IO processes. For example, when each of the host buffer units 2101 is 4 KB, one IO process may be a single write operation on 4 KB data. In another example, one IO process may be a single read operation on 4 KB data.

For example, the host buffer memory 2100 may have a size of 32 KB, and the host buffer unit 2101 may have a size of 4 KB. In this example, when a request for 32 KB data, i.e., a request for eight IO processes IOP #0 to IOP #7 is made, eight host buffer units 2101 may be allocated for the eight IO processes, respectively. The assigned eight host buffer units 2101 may be used for the eight IO processes, which may be write or read operations, and then be released after the completion of the eight IO processes IOP #0 to IOP #7. In other words, the eight host buffer units 2101 corresponding to physical buffer IDs PBIDs having values of 1 to 8 may be allocated for the eight IO processes and then released after the completion of the eight IO processes IOP #0 to IOP #7.

When a new request for 16 KB data, i.e., a request for four IO processes IOP #8 to IOP #11 is made after the completion of the previous eight IO processes IOP #0 to IOP #7, four host buffer units 2101 may be allocated for the four IO processes, respectively. Since the previously allocated eight host buffer units 2101 for the previous eight IO processes IOP #0 to IOP #7 are released after the completion of the previous eight IO processes IOP #0 to IOP #7, four of those eight host buffer units 2101 may be re-allocated for the current four IO processes IOP #8 to IOP #11. For example, the four host buffer units 2101 corresponding to physical buffer IDs PBIDs having values of 4, 3, and 6 may be allocated and then again released after the completion of the four IO processes IOP #8 to IOP #11.

For example, physical addresses on the host buffer memory 2100 for the 32 KB data may be {E000, 0, 2000, 8000, 4000, 0000, A000, 6000}, which may be represented as {0x7, 0, 1, 4, 2, 6, 5, 3} as physical buffer IDs PBIDs.

Referring to FIG. 12, the above operations will be described through virtual address allocation. The previously generated eight IO processes may be expressed as one start virtual address or one start virtual buffer ID VBID having a value of 1 and seven virtual addresses or virtual buffer IDs VBID having values of 2 to 8 sequentially following the start virtual address or the start virtual buffer ID VBID. In other words, the previously generated eight IO processes may be processed as one IO process IOP #0. In other words, one IO process IOP #0 corresponding to the previously generated eight IO processes may be represented as one start virtual address or one start virtual buffer ID VBID having a value of 1 and the virtual addresses or virtual buffer IDs VBIDs having values 2 to 8. In addition, physical buffer space corresponding thereto in the memory buffer 720 or the buffer memory device 1300 may be {0, 2000, 4000, 6000, 8000, A000, C000, E000}. For example, the memory buffer 720 and the buffer memory device 1300 may have a size of 64 KB.

The subsequently generated four IO processes may be expressed as one start virtual address or one start virtual buffer ID VBID having a value of 9 and three virtual addresses or virtual buffer IDs VBIDs having values of 10 to 12 sequentially following the start virtual address or the start virtual buffer ID VBID. In other words, the subsequently generated four IO processes may be processed like one IO process IOP #1. In other words, one IO process IOP #1 corresponding to the subsequently generated four IO processes may be represented as one start virtual address or one start virtual buffer ID VBID having a value of 9 and the virtual addresses or virtual buffer IDs VBIDs having values 10 to 12. In addition, physical buffer space corresponding thereto in the memory buffer 720 or the buffer memory device 1300 may be {10000, 12000, 14000, 16000}.

As described above, the plurality of IO processes may be expressed as one start virtual address or one start virtual buffer ID VBID and the number of virtual addresses or the number of virtual buffer IDs VBIDs, so that a command may be efficiently generated or processed.

Figure 13:
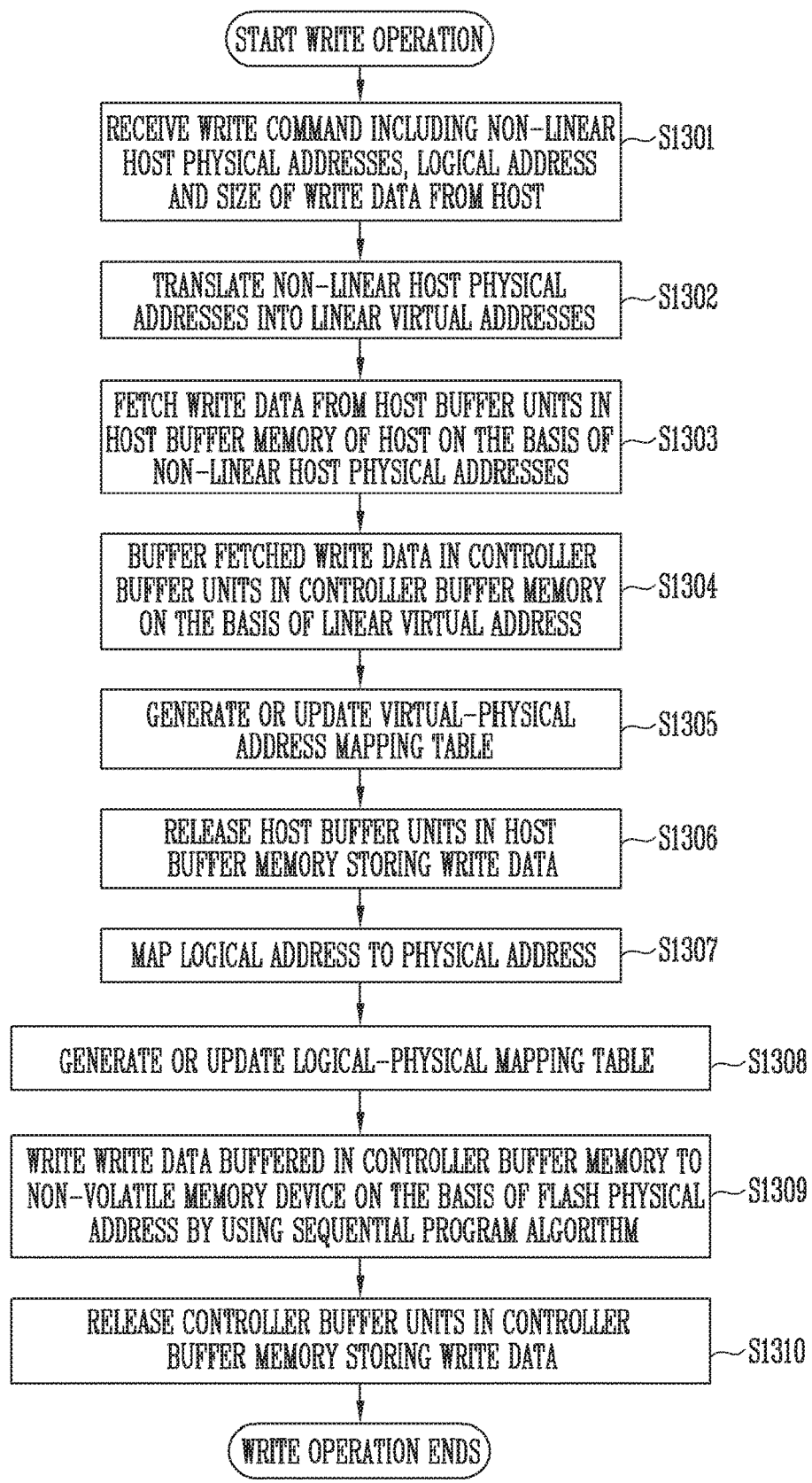
FIG. 13 is a flowchart describing a write operation according to an embodiment.

FIG. 13 is a flowchart describing a write operation according to an embodiment.

Referring to FIG. 13, during a write operation, a write command including non-linear host physical addresses HPAs, a logical address and a size of write data may be received from the host 2000 at step S1301. Step S1301 may be performed by the host interface 740 of the memory controller 1200. Subsequently, the host address translation section 741 may translate the non-linear host physical addresses HPAs into linear virtual addresses VAs at step S1302. The linear virtual addresses VAs may be expressed as a start virtual address VA and the size of the write data (i.e., the number of host buffer units 2101 corresponding to the non-linear host physical addresses HPAs).

After step S1302, the write data may be fetched from the host buffer units 2101 in the host buffer memory 2100 of the host 2000 based on the non-linear host physical addresses HPAs at step S1303. Step S1303 may be performed by the host control section 711 of the memory controller 1200. Subsequently, the fetched write data may be buffered in the controller buffer units 1301 in the controller buffer memory based on the linear virtual addresses VAs at step S1304. Step S1304 may be performed by the host control section 711 of the memory controller 1200.

The host address translation section 741 may generate or update the virtual-physical address mapping table at step S1305. Step S1305 may be performed after step S1302. For example, step S1305 may be performed prior to or in parallel with steps S1303 and S1304. The virtual-physical address mapping table may include mapping information between the non-linear host physical addresses HPAs and the linear virtual addresses VAs.

After step S1304, the host 2000 may release the host buffer units 2101 in the host buffer memory 2100 storing the write data at step S1306. Step S1306 may be performed after step S1304. For example, step S1306 may be performed before or after steps S1307 to S1310, or in another example, step S1606 may be performed in parallel with steps S1307 to S1310.

After step S1304, the logical address may be mapped to a flash physical address at step S1307. Step S1307 may be performed by the flash translation section 713 of the memory controller 1200. In addition, the flash translation section 713 may generate or update a logical-physical address mapping table at step S1308. The logical-physical address mapping table may include mapping information between the flash physical address and the logical address received from the host 2000.

After step S1307, the write data buffered in the controller buffer memory 1301 may be written to the non-volatile memory device 1100 based on the flash physical address by using a sequential program algorithm at step S1309. Step S1309 may be controlled by the flash control section 712. The sequential program algorithm may be an algorithm which is set to enable more efficient operation than a random program when data to be programmed has sequential addresses.

After step S1309, after the write data buffered in the controller buffer memory 1301 are loaded to the page buffer group 230 of the non-volatile memory device 1100, the controller buffer units 1301 in the controller buffer memory storing the write data may be released at step S1310. Step S1310 may be controlled by the flash control section 712. Subsequently, the write operation may be terminated.

As described above, the write operation may be efficiently performed in the memory system 1000 by mapping non-linear host physical addresses HPAs on the host buffer memory 2100 to linear virtual addresses VAs on the memory buffer 720 or the buffer memory device 1300. In other words, the memory system 1000 may perform a program operation to pages corresponding to sequential addresses in the non-volatile memory device 1100 with the write data buffered in the memory buffer 720 or the buffer memory device 1300 by using a sequential program algorithm. As a result, performance of the program operation may be improved.

Figure 14:
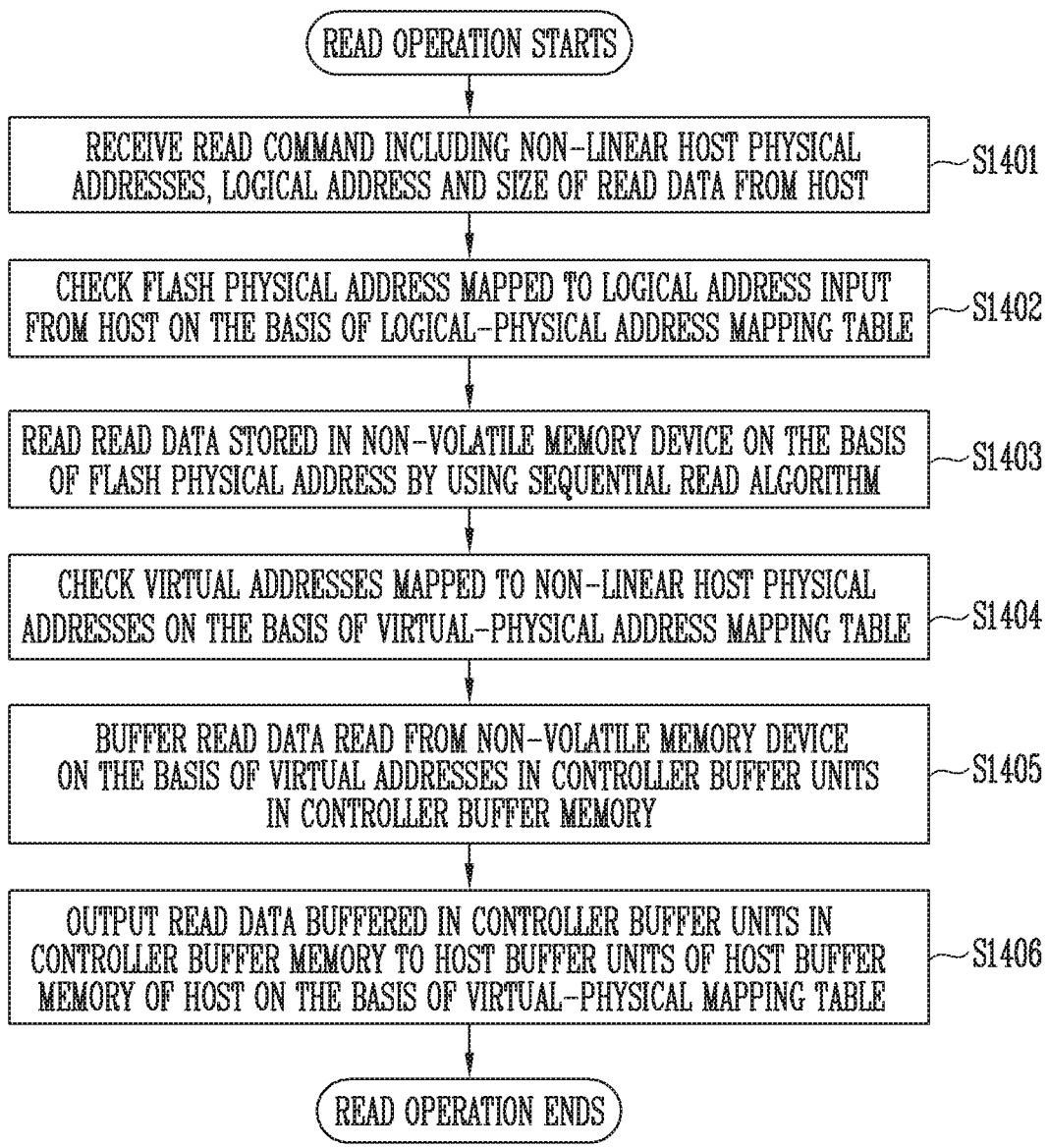
FIG. 14 is a flowchart describing a read operation according to an embodiment.

FIG. 14 is a flowchart describing a read operation according to an embodiment.

Referring to FIG. 14, during a read operation, a read command including non-linear host physical addresses HPAs, a logical address and a size of read data may be received from the host 2000 at step S1401. Step S1401 may be performed by the host interface 740 of the memory controller 1200. After step S1401, a flash physical address mapped to the logical address input from the host 2000 based on the logical-physical address mapping table may be checked at step S1402. Step S1402 may be controlled by the flash translation section 713. The logical-physical address mapping table may include mapping information between the logical address received from the host 2000 and the flash physical address indicating storage space in the non-volatile memory device 1100 storing read data.

After step S1402, the read data stored in the non-volatile memory device 1100 may be read based on the flash physical address by using a sequential read algorithm at step S1403. Step S1403 may be controlled by the flash control section 712. The sequential read algorithm may be an algorithm which is set to enable more efficient read than random read when data to be read has sequential addresses.

Virtual addresses VAs mapped to the non-linear host physical addresses HPAs based on the virtual-physical address mapping table may be checked at step S1404. Step S1404 may be controlled by the host address translation control section 741. Step S1404 may be performed prior to or in parallel with steps S1402 and S1403.

After steps S1403 and S1404, the read data which is read from the non-volatile memory device 1100 may be buffered in the controller buffer units 1301 in the controller buffer memory based on the virtual addresses VAs at step S1405. Step S1405 may be controlled by the flash control section 712.

After step S1405, the read data buffered in the controller buffer units 1301 in the controller buffer memory may be output to the host buffer units 2101 of the host buffer memory 2100 based on the virtual-physical address mapping table. Step S1406 may be controlled by the host control section 711.

As described above, the virtual-physical address mapping table generated or updated by the host address translation section 741 may be transferred to the host control section 711 or the flash control section 712. In addition, information about the logical-physical address mapping table generated or updated by the flash translation section 713 may be transferred to the host control section 711 or the flash control section 712.

As described above, the read operation may be efficiently performed in the memory system 1000 by mapping non-linear host physical addresses HPAs on the host buffer memory 2100 to linear virtual addresses VAs on the memory buffer 720 or the buffer memory device 1300. In other words, the memory system 1000 may read data stored in pages corresponding to sequential addresses in the non-volatile memory device 1100 by using a sequential read algorithm, so that performance of the read operation may be improved.

Figure 15:
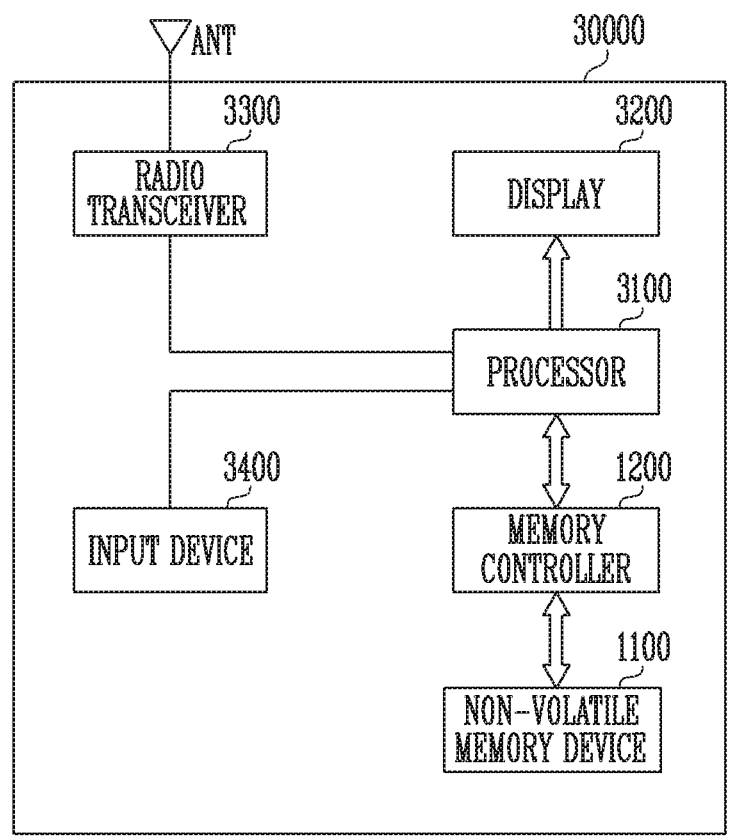
FIGS. 15 to 18 are diagrams illustrating various examples of a memory system according to one or more embodiments of the present invention.

FIG. 15 is a diagram illustrating an embodiment of a memory system 30000.

Referring to FIG. 15, a memory system 30000 may be embodied as a cellular phone, a smartphone, a tablet PC, a personal digital assistant (PDA) or a wireless communication device. The memory system 30000 may include the non-volatile memory device 1100 and the memory controller 1200 controlling the operations of the non-volatile memory device 1100. The memory controller 1200 may control a data access operation of the non-volatile memory device 1100, for example, a program operation, an erase operation, or a read operation in response to control of the processor 3100.

The memory controller 1200 may control data programmed into the non-volatile memory device 1100 to be output through a display 3200.

A radio transceiver 3300 may exchange a radio signal through an antenna ANT. For example, the radio transceiver 3300 may change the radio signal received through the antenna ANT into a signal which can be processed by the processor 3100. Therefore, the processor 3100 may process the signal output from the radio transceiver 3300 and transfer the processed signal to the memory controller 1200 or the display 3200. The memory controller 1200 may program the signal processed by the processor 3100 into the non-volatile memory device 1100. In addition, the radio transceiver 3300 may change a signal output from the processor 3100 into a radio signal and output the radio signal to an external device through the antenna ANT. A control signal for controlling the operations of the processor 3100 or data to be processed by the processor 3100 may be input by the input device 3400, and the input device 3400 may include a pointing device, such as a touch pad and a computer mouse, a keypad, or a keyboard. The processor 3100 may control the operations of the display 3200 so that data output from the memory controller 1200, data output from the radio transceiver 3300, or data output from the input device 3400 may be output through the display 3200.

According to an embodiment, the memory controller 1200 controlling the operations of the non-volatile memory device 1100 may form part of the processor 3100, or may be formed as a separate chip from the processor 3100. Further, the memory controller 1200 may be configured in accordance with the memory controller 1200 illustrated in FIG. 2.

Figure 16:
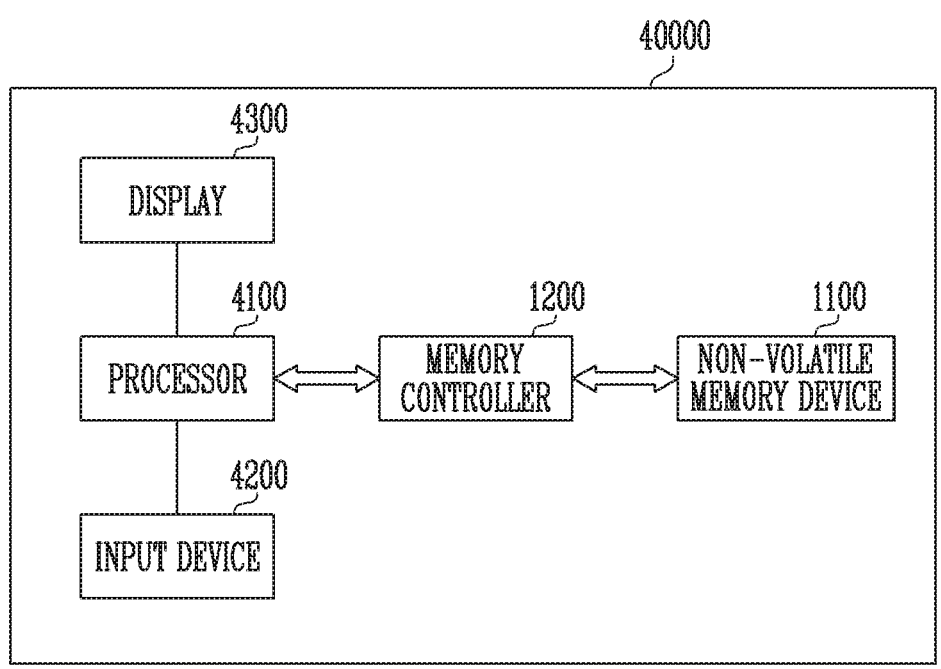

FIG. 16 is a diagram illustrating an embodiment of a memory system 40000.

Referring to FIG. 16, the memory system 40000 may be embodied into a personal computer (PC), a tablet PC, a net-book, an e-reader, a personal digital assistant (PDA), a portable multimedia player (PMP), an MP3 player, or an MP4 player.

The memory system 40000 may include the non-volatile memory device 1100 and the memory controller 1200 controlling the operations of the non-volatile memory device 1100.

A processor 4100 may output data stored in the non-volatile memory device 1100 through a display 4300 according to data input through an input device 4200. Examples of the input device 4200 may include a pointing device such as a touch pad or a computer mouse, a keypad, or a keyboard.

The processor 4100 may control the general operations of the memory system 40000 and control the operations of the memory controller 1200. According to an embodiment, the memory controller 1200 controlling the operations of the non-volatile memory device 1100 may form part of the processor 4100, or be formed as a separate chip from the processor 4100. Further, the memory controller 1200 may be configured in accordance with the memory controller 1200 illustrated in FIG. 2.

Figure 17:
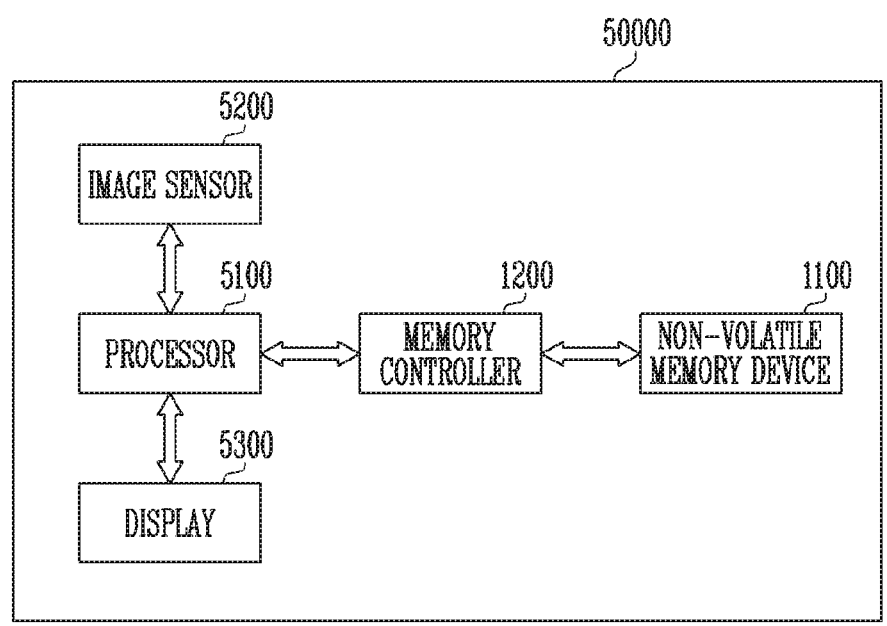

FIG. 17 is a diagram illustrating an embodiment of a memory system 50000.

Referring to FIG. 17, a memory system 50000 may be provided as an image processing device, for example, a digital camera, or device having or capable of being attached to a digital camera, such as a mobile phone, a smart phone, or a tablet PC.

The memory system 50000 may include the non-volatile memory device 1100 and the memory controller 1200 controlling a data processing operation of the non-volatile memory device 1100, for example, a program operation, an erase operation or a read operation.

An image sensor 5200 of the memory system 50000 may convert an optical image into digital signals, and the converted digital signals may be transferred to the processor 5100 or the memory controller 1200. In response to control of the processor 5100, the converted digital signals may be output through the display 5300 or stored in the semiconductor non-volatile memory device 1100 through the memory controller 1200. In addition, the processor 5100 or the memory controller 1200 may control data stored in the non-volatile memory device 1100 to be output through a display 5300.

According to an embodiment, the memory controller 1200 controlling the operations of the non-volatile memory device 1100 may form part of the processor 5100, or may be formed as a separate chip from the processor 5100. Further, the memory controller 1200 may be configured in accordance with the memory controller 1200 illustrated in FIG. 2.

Figure 18:
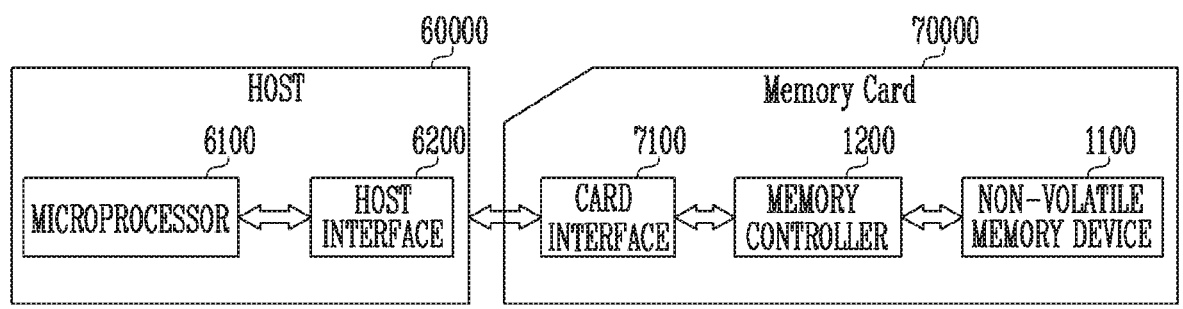

FIG. 18 is a diagram illustrating an embodiment of a memory system 70000.

Referring to FIG. 18, a memory system 70000 may include a memory card or a smart card. The memory system 70000 may include the non-volatile memory device 1100, the memory controller 1200, and a card interface 7100.

The memory controller 1200 may control data exchange between the semiconductor non-volatile memory device 1100 and the card interface 7100. In an embodiment, the card interface 7100 may be, but not limited to, a secure digital (SD) card interface or a multi-media card (MMC) interface. Further, the memory controller 1200 may be configured in accordance with the memory controller 1200 illustrated in FIG. 2.

The card interface 7100 may interface data exchange between a host 60000 and the memory controller 1200 according to a protocol of the host 60000. According to an embodiment, the card interface 7100 may support a Universal Serial Bus (USB) protocol and an InterChip (IC)-USB protocol. The card interface may refer to hardware capable of supporting a protocol which is used by the host 60000, software installed in the hardware, or a signal transmission method.

When the memory system 70000 is connected to a host interface 6200 of the host 60000 such as a PC, a tablet PC, a digital camera, a digital audio player, a cellular phone, console video game hardware or a digital set-top box, the host interface 6200 may perform data communication with the non-volatile memory device 1100 through the card interface 7100 and the memory controller 1200 under the control of a microprocessor 6100.

According to embodiments of the present disclosure, in association with operations of a memory system, performance of a write operation and a read operation may be improved by translating non-linear host physical addresses into linear virtual addresses.

It will be apparent to those skilled in the art that various modifications can be made to the above-described embodiments of the present invention without departing from the spirit or scope of the invention. Thus, it is intended that the present invention cover all such modifications within the scope of the appended claims and their equivalents.

What is claimed is:

1. A memory system, comprising:
a controller buffer memory;
a host interface configured to receive non-linear host physical addresses and write data from a host;
a host address translation section configured to map the non-linear host physical addresses to linear virtual addresses; and
a host control section configured to buffer the write data in the controller buffer memory according to the linear virtual addresses, wherein the host includes a plurality of host buffer units, and each of the non-linear host physical addresses corresponds to one of the plurality of host buffer units, and wherein one or more of the linear virtual addresses corresponds to the plurality of host buffer units.

2. The memory system of claim 1, wherein the host includes a host buffer memory that include the plurality of host buffer units which are further configured to store the write data.

3. The memory system of claim 2, further comprising:
a non-volatile memory device;
a flash translation section configured to translate a logical address received from the host into a flash physical address; and
a flash control section configured to control writing the write data buffered in the controller buffer memory to the non-volatile memory device according to the flash physical address.

4. The memory system of claim 3, wherein the flash control section writes the write data buffered in the controller buffer memory to the non-volatile memory device according to a sequential program algorithm.

5. The memory system of claim 2, wherein the host address translation section reverts to a first linear virtual address after a final linear virtual address is mapped.

6. The memory system of claim 2, wherein each of the plurality of host buffer units corresponds to a single input/output process.

7. The memory system of claim 6, wherein the host address translation section generates, among the linear virtual addresses, a start linear virtual address and one or more linear virtual addresses corresponding to a plurality of input/output processes which correspond to the plurality of host buffer units, and
the host control section buffers the write data in the controller buffer memory according to the start linear virtual address and the one or more linear virtual addresses.

8. The memory system of claim 3, wherein the host interface receives a write command from the host, and
the write command includes the non-linear host physical addresses, the logical address, and size information of the write data.

9. The memory system of claim 2, wherein each of the plurality of host buffer units has the same size as a controller buffer unit in the controller buffer memory.

10. A memory system, comprising:
a controller buffer memory including a plurality of controller buffer units configured to buffer data;
a host address translation section configured to generate a physical-virtual address mapping table; and
a host control section configured to output the data buffered in the controller buffer memory to a host buffer memory of a host according to the physical-virtual address mapping table,
wherein the physical-virtual address mapping table includes a plurality of non-linear host buffer IDs corresponding to a plurality of host buffer units in the host buffer memory and a plurality of linear virtual buffer IDs corresponding to the plurality of controller buffer units, and wherein the host address translation section generates one or more linear virtual buffer IDs corresponding to a plurality of input/output processes.

11. The memory system of claim 10, wherein the host address translation section generates, among the linear virtual buffer IDs, a start linear virtual buffer ID corresponding to the plurality of input/output processes, and
the host control section controls outputting the data buffered in the controller buffer memory according to the start linear virtual buffer ID and the one or more linear virtual buffer IDs.

12. The memory system of claim 10, wherein the host interface receives a read command from the host, and
the read command includes host physical addresses, a logical address, and size information of the data.

13. The memory system of claim 12, further comprising:
a non-volatile memory device configured to store the data; and
a flash control section configured to control reading of the data from the non-volatile memory device according to a sequential read algorithm and buffering the data in the controller buffer memory.

14. The memory system of claim 13, further comprising a flash translation section configured to translate the logical address into a flash physical address, and
the flash control section reads the data from the non-volatile memory device based on the flash physical address.

15. The memory system of claim 10, wherein each of the plurality of host buffer units and each of the plurality of controller buffer units has the same size.

16. A method of operating a memory system, the method comprising:
receiving a write command including non-linear host physical addresses from a host;
mapping the non-linear host physical addresses to linear virtual addresses, using an address translation component;
fetching write data from a host buffer memory of the host according to the non-linear host physical addresses; and
buffering the write data in a controller buffer memory on according to the linear virtual addresses,
wherein the host buffer memory includes a plurality of host buffer units, and each of the non-linear host physical addresses corresponds to one of the plurality of host buffer units, and
wherein one or more of the linear virtual addresses corresponds to the plurality of host buffer units.

17. The method of claim 16, wherein the plurality of host buffer units are configured to store the write data.

18. The method of claim 17, further comprising:
releasing the plurality of host buffer units after the write data stored therein is processed in an input/output process; and
reallocating the released plurality of host buffer units for a new input/output process.

19. The method of claim 16, further comprising writing data buffered in the controller buffer memory to a non-volatile memory device according to a sequential program algorithm.

20. The method of claim 17, wherein each of the plurality of host buffer units corresponds to a single input/output process.

* * * * *